United States Patent
Shih et al.

(10) Patent No.: US 10,823,895 B2
(45) Date of Patent: Nov. 3, 2020

(54) LIGHT-EMITTING MODULE

(71) Applicant: E Ink Holdings Inc., Hsinchu (TW)

(72) Inventors: Yao-Tsung Shih, Hsinchu (TW); Mei-Chen Chang, Hsinchu (TW); Yu-Nan Pao, Hsinchu (TW); Hsin-Tao Huang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 15/652,261

(22) Filed: Jul. 18, 2017

(65) Prior Publication Data

US 2017/0329070 A1    Nov. 16, 2017

Related U.S. Application Data

(63) Continuation-in-part of application No. 14/540,042, filed on Nov. 13, 2014, now Pat. No. 9,739,925.

(30) Foreign Application Priority Data

Jan. 29, 2014 (TW) .............................. 103103617 A
Apr. 7, 2017 (CN) .......................... 2017 1 0222786
Apr. 7, 2017 (CN) .......................... 2017 1 0226954

(51) Int. Cl.
*F21V 8/00* (2006.01)

(52) U.S. Cl.
CPC ......... *G02B 6/0036* (2013.01); *G02B 6/0016* (2013.01); *G02B 6/0031* (2013.01); (Continued)

(58) Field of Classification Search
CPC ... G02B 6/0036; G02B 6/0068; G02B 6/0031
See application file for complete search history.

(56) References Cited

U.S. PATENT DOCUMENTS 6,742,907 B2    6/2004   Funamoto
7,083,317 B2    8/2006   Higashiyama
(Continued)

FOREIGN PATENT DOCUMENTS

CN    1258113 C    5/2006
CN    1900786 A    1/2007
(Continued)

OTHER PUBLICATIONS

Corresponding Taiwanese office action dated Dec. 19, 2017.
(Continued)

*Primary Examiner* — Sharon E Payne
(74) *Attorney, Agent, or Firm* — CKC & Partners Co., LLC

(57) ABSTRACT

The present disclosure provides a light-emitting module. The light-emitting module includes a light guide plate, a light source, and a brightness adjustment element. The light guide plate has a light incident surface, a front surface, and a back surface opposite the front surface. The light incident surface is located between the front surface and the back surface and is adjacent to the front surface and the back surface. The brightness adjustment element has a strip portion and at least one protruding portion. The strip portion has a first edge proximal to the light incident surface. The protruding portion is located on the first edge of the strip portion, and the protruding portion is aligned with the light source and extends away from the first edge.

23 Claims, 24 Drawing Sheets

(52) U.S. Cl.
CPC ......... *G02B 6/0068* (2013.01); *G02B 6/0083* (2013.01); *G02B 6/0093* (2013.01)

(56) References Cited

U.S. PATENT DOCUMENTS

| | | | |
|---|---|---|---|
| 7,192,176 B2 | 3/2007 | Lo et al. | |
| 7,484,873 B2 | 2/2009 | Dejima et al. | |
| 7,507,012 B2 | 3/2009 | Aylward et al. | |
| 7,548,287 B2 | 6/2009 | Oh | |
| 7,639,317 B2 | 12/2009 | Cho | |
| 7,982,818 B2 | 7/2011 | Chung et al. | |
| 8,047,697 B2 | 11/2011 | Shigeta et al. | |
| 8,212,955 B2 | 7/2012 | Tang | |
| 8,253,894 B2 | 8/2012 | Ohmi et al. | |
| 8,308,338 B2 | 11/2012 | Chang et al. | |
| 8,330,708 B2 | 12/2012 | Park et al. | |
| 8,355,093 B2 | 1/2013 | Shin et al. | |
| 8,441,596 B2 | 5/2013 | Shiraishi et al. | |
| 8,596,854 B2 | 12/2013 | Shiao | |
| 8,651,723 B2* | 2/2014 | Juestel | F21K 9/00 362/613 |
| 8,931,943 B2 | 1/2015 | Kunimochi | |
| 2003/0043157 A1 | 3/2003 | Miles | |
| 2003/0206408 A1 | 11/2003 | Funamoto et al. | |
| 2004/0130885 A1* | 7/2004 | Nakano | G02B 6/0031 362/633 |
| 2004/0233524 A1* | 11/2004 | Lippey | G02B 5/0816 359/443 |
| 2005/0286854 A1* | 12/2005 | Honma | G02B 6/0048 385/146 |
| 2007/0008739 A1 | 1/2007 | Kim et al. | |
| 2007/0126948 A1 | 6/2007 | Kim et al. | |
| 2007/0209756 A1* | 9/2007 | Nakayama | B32B 37/0015 156/272.2 |
| 2008/0136999 A1* | 6/2008 | Mager | D06F 39/005 349/62 |
| 2008/0158875 A1 | 7/2008 | Kim et al. | |
| 2009/0046220 A1* | 2/2009 | Tsuchiya | G02B 6/0036 349/65 |
| 2009/0052031 A1 | 2/2009 | Yamada | |
| 2011/0187967 A1 | 8/2011 | Shinohara et al. | |
| 2011/0305004 A1 | 12/2011 | Kim et al. | |
| 2012/0262643 A1 | 10/2012 | Kweon et al. | |
| 2014/0036541 A1* | 2/2014 | Takada | G02B 6/0068 362/613 |
| 2016/0161088 A1 | 6/2016 | Sung et al. | |
| 2016/0161660 A1 | 6/2016 | Kim et al. | |
| 2016/0195222 A1 | 7/2016 | Liu | |

FOREIGN PATENT DOCUMENTS

| | | |
|---|---|---|
| CN | 200965602 Y | 10/2007 |
| CN | 101078795 A | 11/2007 |
| CN | 102192440 A | 9/2011 |
| CN | 102213385 A | 10/2011 |
| CN | 102269839 A | 12/2011 |
| CN | 102749757 A | 10/2012 |
| CN | 202600179 U | 12/2012 |
| CN | 203082714 U | 7/2013 |
| CN | 203868951 U | 10/2014 |
| CN | 104763937 A | 7/2015 |
| CN | 103728776 B | 2/2016 |
| CN | 205015500 U | 2/2016 |
| CN | 106195693 A | 12/2016 |
| JP | 209004197 A | 1/2009 |
| JP | 2010243959 A | 10/2010 |
| JP | 2012-14909 A | 1/2012 |
| TW | 200304022 A | 9/2003 |
| TW | 201122576 A | 7/2011 |
| TW | I456311 B | 10/2014 |
| TW | 201537267 A | 10/2015 |
| TW | 201617549 A | 5/2016 |

OTHER PUBLICATIONS

Corresponding Taiwanese office action dated Jun. 29, 2017.
Corresponding Taiwanese office action dated Sep. 18, 2015.
Corresponding Chinese office action dated Sep. 29, 2016.
Corresponding Chinese office action dated Aug. 23, 2019.
Corresponding Chinese office action dated Oct. 12, 2019.

* cited by examiner

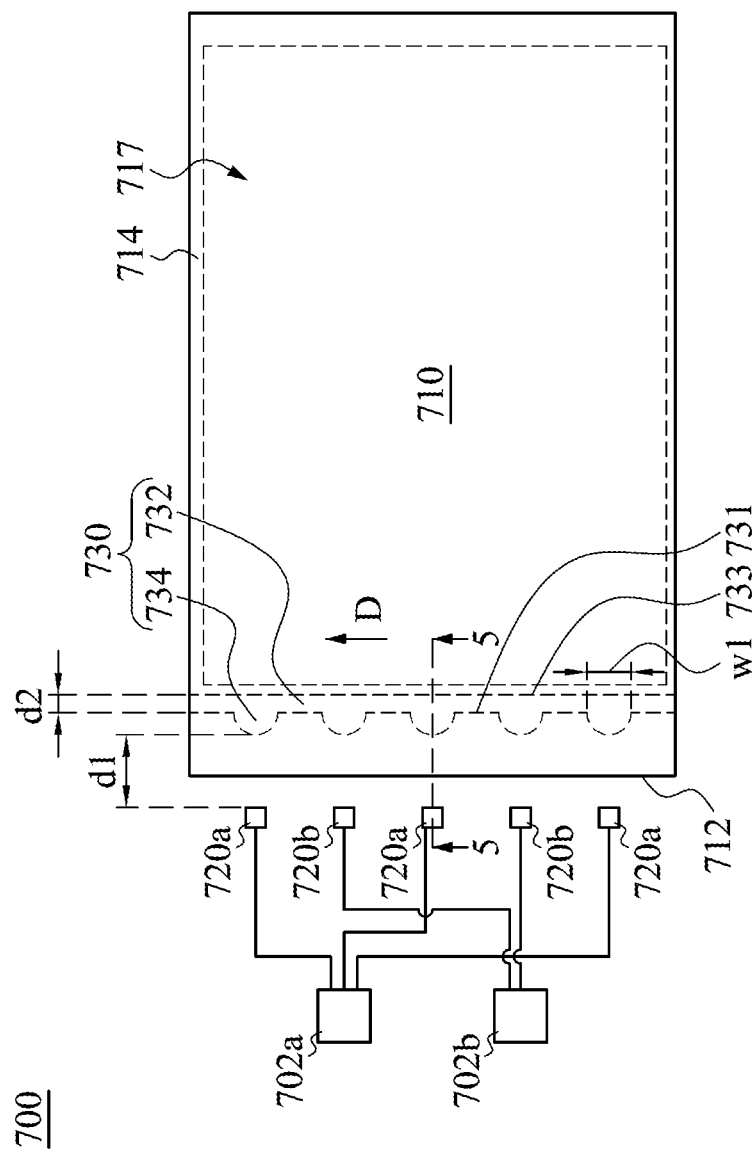

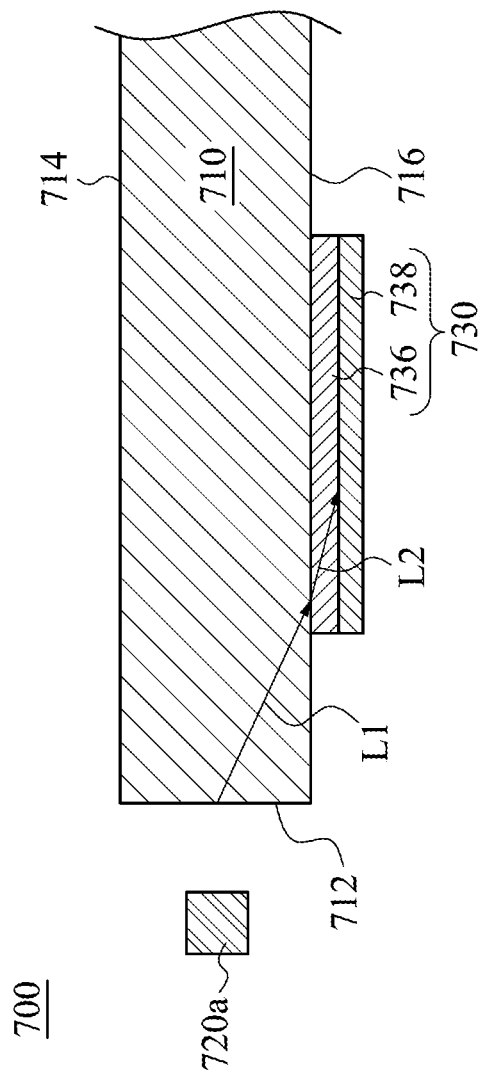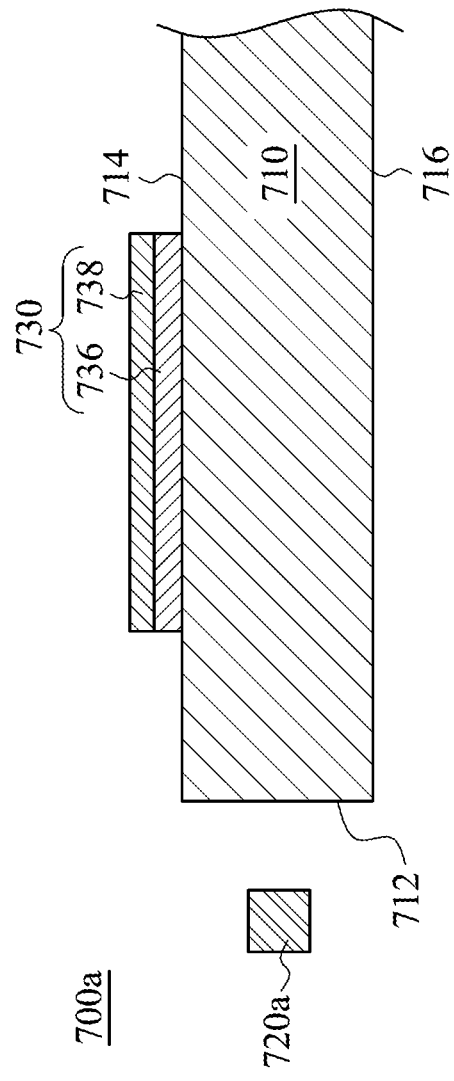

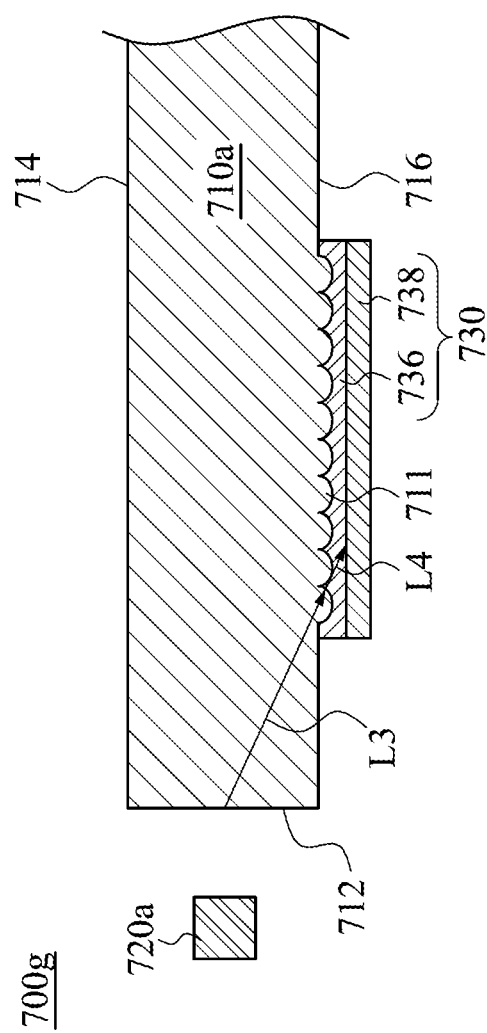
Fig. 13
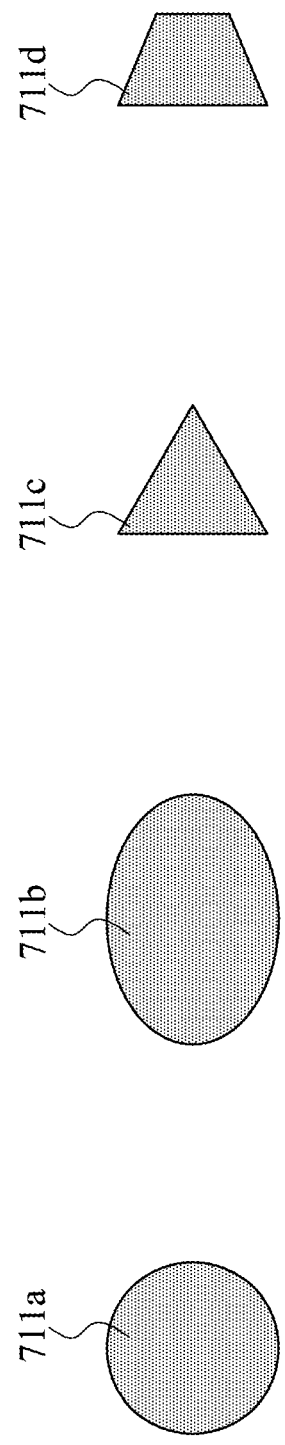
Fig. 14A
Fig. 14B
Fig. 14C
Fig. 14D

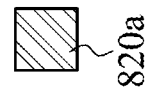

LIGHT-EMITTING MODULE

RELATED APPLICATIONS

This application is a Continuation-in-part of U.S. application Ser. No. 14/540,042, filed on Nov. 13, 2014, which claims priority of Taiwan Patent Application Serial Number 103103617, filed on Jan. 29, 2014, and this application claims priority to China Application Serial Number 201710226954.8, filed on Apr. 7, 2017, and China Application Serial Number 201710222786.5, filed on Apr. 7, 2017, the entirety of which is incorporated by reference herein.

BACKGROUND

Technical Field

The present disclosure relates to a light-emitting module, and more particularly, to a light-emitting module having a light-adjusting film.

Description of Related Art

In a conventional display device, a light-emitting module is indispensable. The light-emitting module is usually composed of a light guide plate, a light source and a light-blocking strip. The light source emits light toward a light-entering surface of the light guide plate, and the light may be uniformly extracted from a light-extracting surface of the light guide plate by an undulating microstructure of the light guide plate.

When the light source is connected with the light guide plate, a crack between the both may generate a light leak, the light-blocking strip is usually used to cover the crack between the light source and the light guide plate to improve the light leak. Generally, the light-blocking strip may be a light absorption strip or a light reflection strip to absorb or reflect light into the light guide plate.

Commonly, light-emitting diodes (LEDs) are used as a light source of the light-emitting module to provide higher brightness and energy-saving property. However, the LED is a point source, which may generate a hot spot while applying in a light-emitting module, so as to cause a nonuniform brightness at a side frame of the display device. Therefore, there is a need for an improved light-emitting module, so as to solve the aforementioned problems met in the art.

SUMMARY

The present disclosure provides a light-emitting module, so as to solve the aforementioned problems met in the art.

One embodiment of the present disclosure is to provide a light-emitting module. The light-emitting module comprises a light guide plate, a plurality of light sources and a first light-adjusting film.

The light guide plate has a light-entering surface, a first light-extracting surface and a second light-extracting surface opposite to the first light-extracting surface, wherein the first light-extracting surface has a light-adjusting area. The light sources emit light toward the light-entering surface of the light guide plate.

The first light-adjusting film has a first light absorption portion, a plurality of second light absorption portions and a plurality of first light reflection portions. The first light absorption portion is positioned over the light sources, and the second light absorption portions and the first light reflection portions are positioned on the light-adjusting area of the first light-extracting surface. The second light absorption portions are extended from the first light absorption portion, and one of the first light reflection portions is located between two neighboring second light absorption portions, so that the second light absorption portions and the first light reflection portions are alternately arranged.

According to one embodiment of the present disclosure, the first light absorption portion and the second light absorption portions are black.

According to one embodiment of the present disclosure, the first light absorption portion and the second light absorption portions have a rough surface.

According to one embodiment of the present disclosure, the first light reflection portions are white.

According to one embodiment of the present disclosure, the first light reflection portions further comprise a reflective layer.

According to one embodiment of the present disclosure, the reflective layer is a metal layer.

According to one embodiment of the present disclosure, the material of the metal layer includes silver, aluminum or tin.

According to one embodiment of the present disclosure, a pattern of the first light reflection portions is in rectangle, trapezoid, triangle, semicircle, semiellipse or a combination thereof.

According to one embodiment of the present disclosure, a distance between two neighboring light sources is in a range of about 1 cm to 2 cm.

According to one embodiment of the present disclosure, the second light absorption portions are extended in a range of about 0.3 cm to 1 cm, from the first light absorption portion.

According to one embodiment of the present disclosure, the light sources are a point source.

According to one embodiment of the present disclosure, the point source is a light-emitting diode.

According to one embodiment of the present disclosure, a width of the light sources is in a range of about 3 mm to 6 mm.

According to one embodiment of the present disclosure, a width of the second light absorption portions is greater than the width of the light sources.

According to one embodiment of the present disclosure, the first light absorption portion and the second light absorption portions are formed a comb structure.

According to one embodiment of the present disclosure, the light-emitting module further comprises a second light-adjusting film having a third light absorption portion, a plurality of fourth light absorption portions and a plurality of second light reflection portions. The third light absorption portion is positioned under the light sources. The fourth light absorption portions and the second light reflection portions are positioned on a light-adjusting area of the second light-extracting surface. The fourth light absorption portions are extended from the third light absorption portion, and one of the second light reflection portions is located between two neighboring fourth light absorption portions, so that the fourth light absorption portions and the second light reflection portions are alternately arranged.

Another embodiment of the present disclosure is to provide a display device. The display device comprises a display unit and the light-emitting module as mentioned above. The display unit has a display surface, and the light-emitting module is positioned on the display unit. The second light-extracting surface of the light guide plate of the light-emitting module is toward the display surface of the display unit.

According to one embodiment of the present disclosure, the display unit is a reflective display unit.

An aspect of the invention is to provide a light-emitting module.

According to an embodiment of the present invention, a light-emitting module includes a light guide plate, at least one light source, and a brightness adjustment element is provided. The light guide plate has a light incident surface, a front surface and a back surface opposite the front surface. The light incident surface is located between the front surface and the back surface and is adjacent to the front surface and the back surface. The light source is located outside the light guide plate, and faces the light incident surface of the light guide plate. The brightness adjustment element is located on the front surface or the back surface of the light guide plate, and the brightness adjustment element includes a strip portion and at least one protruding portion. The stripe portion has a first edge proximal to the light incident surface. The protruding portion is located on the first edge of the stripe portion. The protruding portion is aligned with the light source, and extends away from the first edge.

In an embodiment of the present invention, the protruding portion is located on the light guide plate, and the strip portion overlaps the light source.

In an embodiment of the present invention, the protruding portion and the strip portion are located on the light guide plate, and the protruding portion extends toward the light source.

In an embodiment of the present invention, a distance between the protruding portion and the light source is in a range from 4 mm to 6 mm.

In an embodiment of the present invention, the strip portion has a second edge opposite the first edge, and a distance between the first edge and the second edge is in a range from 1 mm to 3 mm.

In an embodiment of the present invention, the brightness adjustment element has an adhesive layer and a light absorbing layer. The adhesive layer is located between the light absorbing layer and the light guide plate.

In an embodiment of the present invention, wherein a difference between a refractive index of the adhesive layer and a refractive index of the light guide plate is from in a range 0.1 to 0.7.

In an embodiment of the present invention, wherein a length direction of the strip portion is the same as a length direction of the light incident surface of the light guide plate.

In an embodiment of the present invention, wherein a width of the protruding portion increases as a distance between the light source and the protruding portion increases.

In an embodiment of the present invention, wherein the light-emitting module further includes a cover. The cover covers the brightness adjustment element, the light source, and a shaded area of the light guide plate.

In an embodiment of the present invention, wherein the brightness adjustment element is located in the shaded area of the light guide plate.

In an embodiment of the present invention, wherein the light-emitting module has a plurality of light sources, and the light sources are electrically connected to at least two driving elements. A first portion of the light sources has a first color temperature, and a second portion of the light sources has a second color temperature, and the first portion and the second portion of the light sources are respectively electrically connected to the two driving elements.

In an embodiment of the present invention, wherein the light guide plate further includes a microstructure region located on a surface of the front surface or the back surface of the light guide plate, and the brightness adjustment element is located on the same surface of the light guide plate and covers the microstructure region.

In an embodiment of the present invention, wherein a position of the microstructure region corresponds to a position of the light source.

In an embodiment of the present invention, since the protruding portion of the brightness adjustment element is aligned with the light source and extends toward the light source, it can absorb the light of the high energy area in front of the light source, to avoid light area being generated in an area of the light guide plate in front of the light source. Moreover, since the brightness adjustment element has a strip portion connected to the protruding portion, the brightness adjustment element hence can be easily disposed on the light guide plate, to promote the assembly convenience. In addition, the strip portion can further increase the brightness uniformity, and avoid the light guide plate having uneven light fringes due to the existence of the protruding portion, the cutting tolerance of the brightness adjustment element, or the attachment tolerance of the brightness adjustment element. By the design of the protruding portion to make the brightness adjustment element have different light absorbing degrees, the brightness adjustment element can make the energy evenly distributed to each position of the visual area when the light transmits to the light guide plate, and hence decrease the hot spot mura.

An aspect of the present invention is a light-emitting module.

According to an embodiment of the present invention, a light-emitting module including at least one light source, and a light guide plate is provided. The light guide plate has a microstructure region, a light incident surface, a front surface and a back surface opposite the front surface. The light incident surface is located between the front surface and the back surface, and is adjacent to the front surface and the back surface. The microstructure region is located on the front surface or the back surface. The microstructure region is proximal to the light incident surface, the microstructure region corresponds to the light source, and the microstructure region has a plurality of microstructures therein. The light source is located outside the light guide plate and faces the light incident surface of the light guide plate.

In an embodiment of the present invention, wherein a distance between the microstructure region and the light incident surface of the light guide plate is from 1 mm to 5 mm.

In an embodiment of the present invention, wherein the microstructures in the microstructure region are bumps or pits.

In an embodiment of the present invention, wherein the light-emitting module further includes brightness adjustment element. The brightness adjustment element covers the microstructure region. The brightness adjustment element has a first edge and a second edge opposite the first edge, and a distance between the first edge and the second edge is not less than a width of the microstructure region.

In an embodiment of the present invention, wherein the brightness adjustment element has an adhesive layer and a scattering layer, and the adhesive layer is located between the scattering layer and the light guide plate.

In an embodiment of the present invention, wherein the light-emitting module further includes a cover. The cover covers the microstructure region, the light source, and a shaded area of the light guide plate.

In an embodiment of the present invention, wherein the microstructure region is located in the shaded area of the light guide plate.

In an embodiment of the present invention, since the microstructure region is located on the front surface or the back surface of the light guide plate, and the microstructure region corresponds to the light source, when the light source emits lights, the microstructure region can destroy the total reflection of the light, to make the light refract at and exit from the microstructure region, thus avoid light area being generated in an area of the light guide plate in front of the light source. That is, by the design of the microstructure region, the light guide plate can decrease the energy in the area close to the light source to make the energy evenly distributed to each position of the visual area when the light transmits to the light guide plate, thereby decreasing the hot spot mura.

It is to be understood that both the foregoing general description and the following detailed description are by examples, and are intended to provide further explanation of the invention as claimed.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 is a top view of a light-emitting module according to an embodiment of the present invention;

FIG. 5 is a cross-sectional view of the light-emitting module in FIG. 4 taken along line 5-5;

FIG. 6 is a cross-sectional view of a light-emitting module according to an embodiment of the present invention;

FIG. 13 is a cross-sectional view of the light-emitting module in FIG. 12 taken along line 13-13;

FIGS. 14A-14D are diagrams illustrated microstructure regions according to some embodiments of the present invention;

FIG. 16 is a cross-sectional view of the light-emitting module in FIG. 15 taken along line 16-16;

FIG. 17 is a cross-sectional view of a light-emitting module according to an embodiment of the present invention;

DETAILED DESCRIPTION

Figure 1A:
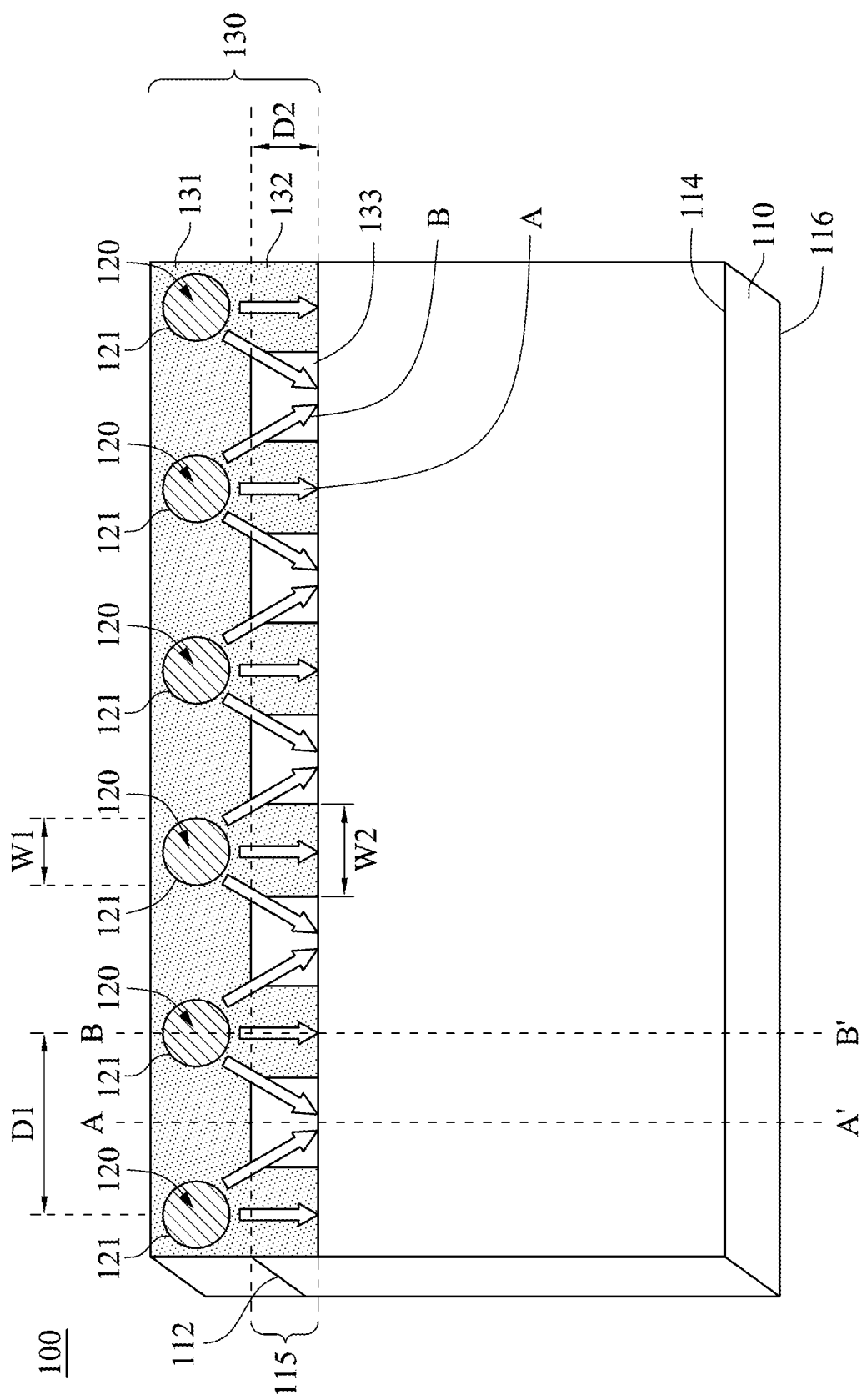
FIG. 1A is a schematic three-dimensional view of a light-emitting module 100 according to one embodiment of the present disclosure, in which the arrow presents a light.

The embodiments of the transparent heat-conducting structure and a method for manufacturing the same of the present disclosure are discussed in detail below, but not limited the scope of the present disclosure. The same symbols or numbers are used to the same or similar portion in the drawings or the description. And the applications of the present disclosure are not limited by the following embodiments and examples which the person in the art can apply in the related field.

The singular forms "a," "an" and "the" used herein include plural referents unless the context clearly dictates otherwise. Therefore, reference to, for example, a metal layer includes embodiments having two or more such metal layers, unless the context clearly indicates otherwise. Reference throughout this specification to "one embodiment" means that a particular feature, structure, or characteristic described in connection with the embodiment is included in at least one embodiment of the present disclosure. Therefore, the appearances of the phrases "in one embodiment" or "in an embodiment" in various places throughout this specification are not necessarily all referring to the same embodiment. Further, the particular features, structures, or characteristics may be combined in any suitable manner in one or more embodiments. It should be appreciated that the following figures are not drawn to scale; rather, the figures are intended; rather, these figures are intended for illustration.

For providing higher brightness and energy-saving property, light-emitting diodes (LEDs) are commonly used as a light source of the light-emitting module. However, the LED is a point source, which may generate a hot spot while applying in a light-emitting module, so as to cause a nonuniform brightness at a side frame of the display device.

One embodiment of the present disclosure is to provide a light-emitting module comprising a light guide plate, a plurality of light sources and a light-adjusting film. In embodiments of the present disclosure, the light-adjusting film may be used to improve the hot spot of the light-emitting module, and have a uniform brightness at a side frame of the display device.

Figure 1B:
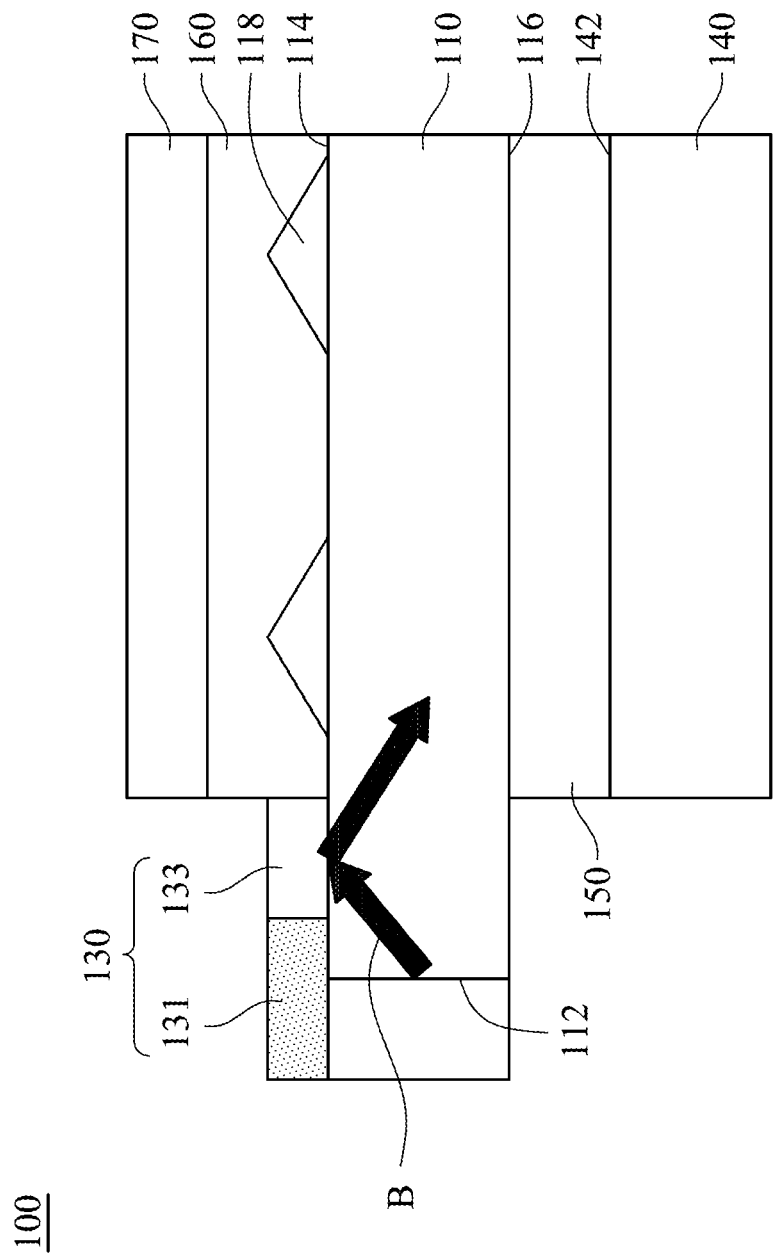
FIG. 1B is schematic cross-sectional view of the light-emitting module material 100 taken along A-A' line of FIG. 1A, in which the arrow presents a light.
Figure 1C:
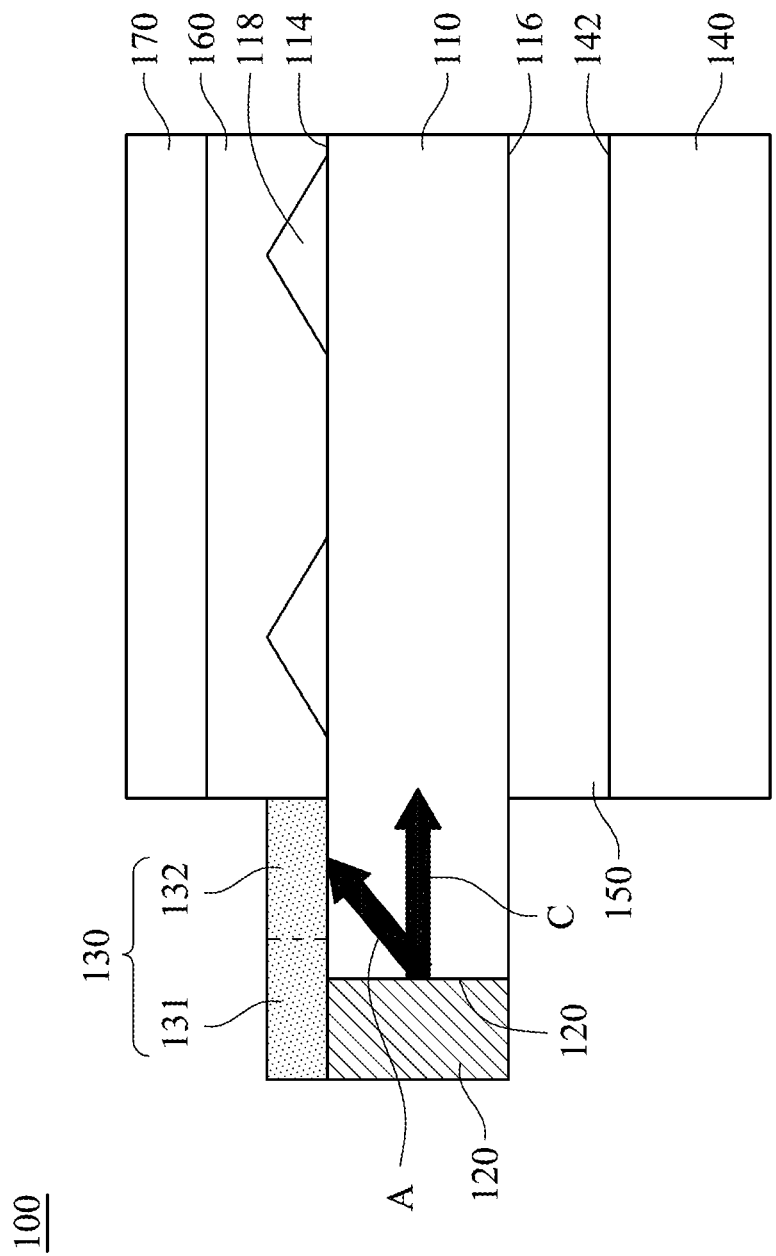
FIG. 1C is schematic cross-sectional view of the light-emitting module material 100 taken along B-B' line of FIG. 1A, in which the arrow presents a light.

Referring to FIGS. 1A, 1B and 1C, FIG. 1A is a schematic three-dimensional view of a light-emitting module 100 according to one embodiment of the present disclosure; FIG. 1B is schematic cross-sectional view of the light-emitting module material 100 taken along A-A' line of FIG. 1A; and FIG. 1C is schematic cross-sectional view of the light-emitting module material 100 taken along B-B' line of FIG. 1A.

In FIG. 1A, the light-emitting module material 100 comprises a light guide plate 110, a plurality of light sources 120 and a first light-adjusting film 130.

The light guide plate 110 has a light-entering surface 112, a first light-extracting surface 114 and a second light-extracting surface 116. The second light-extracting surface 116 is opposite to the first light-extracting surface 114, and the first light-extracting surface 114 has a light-adjusting area 115.

The light sources 120 emit light toward the light-entering surface 112 of the light guide plate 110. In an embodiment of the present disclosure, the light sources 120 are a point source such as a light-emitting diode. According to the brightness of the light sources, the distance (D1) between two neighboring light sources can be adjusted. When the brightness of the light source becomes higher, the distance (D1) between two neighboring light sources becomes longer. In an embodiment of the present disclosure, the distance (D1) between two neighboring light sources is, but not limited to, in a range of about 1 cm to 2 cm. In an embodiment of the present disclosure, a width (W1) of the light sources is in a range of about 3 cm to 6 cm.

The first light-adjusting film 130 has a first light absorption portion 131, a plurality of second light absorption portions 132 and a plurality of first light reflection portions 133. The first light absorption portion 131 is positioned over the light sources 120, and the second light absorption portions 132 and the first light reflection portions 133 are positioned on the light-adjusting area 115 of the first light-extracting surface 114.

There is a distance between two neighboring light sources, so that highlights may appear in front of the light sources 120, and shadows may appear between two neighboring light sources. In FIG. 1A, the second light absorption portions 132 are extended from projection positions 121 of the light sources 120 on the first light absorption portion 131, so as to absorb a part of light A in front of the light sources 120 to reduce the brightness of highlights. In an embodiment of the present disclosure, the first light absorption portion 131 and the second light absorption portions 132 are in black. In an embodiment of the present disclosure, the first light absorption portion 131 and the second light absorption portions 132 have a rough surface. In an embodiment of the present disclosure, the second light absorption portions 132 are extended in a range (D2) of about 0.3 cm to 1 cm, from the first light absorption portion 131. In an embodiment of the present disclosure, a width (W2) of the second light absorption portions 132 is greater than a width (W1) of the light sources (120).

In addition, one of the first light reflection portions 133 is located between two neighboring second light absorption portions 132 to reflect a light B shinning on the first light reflection portions 133, so as to enhance the brightness of the shadows. In an embodiment of the present disclosure, the first light reflection portions 133 further comprise a reflective layer. The reflective layer may be a metal layer, and the material of the metal layer includes silver, aluminum or tin. In an embodiment of the present disclosure, a pattern of the first light reflection portions may be, but not limited to, in rectangle, trapezoid, triangle, semicircle, semiellipse or a combination thereof. In FIG. 1A, the pattern of the first light reflection portions 133 is in rectangle.

In FIG. 1A, the second light absorption portions 132 and the first light reflection portions 133 are alternately arranged. In an embodiment of the present disclosure, the first light absorption portion 131 and the second light absorption portions 132 are formed a comb structure.

In FIG. 1B, the light B enters into the light guide plate 110 through the light-entering surface 112 of the light guide plate 110. The first light reflection portions 133 can reflect the light B to keep the light B entering into the light guide plate 110.

In FIG. 1B, the first light-extracting surface 114 of the light guide plate 110 has an undulating microstructure 118. A first optical clear adhesive (OCA) layer 160 covers the undulating microstructure 118 and the first light-extracting surface 114 of the light guide plate 110, and a transparent protection layer 170 covers the first OCA layer 160. The second light-extracting surface 116 of the light guide plate 110 is toward a display surface 142 of a display unit 140, and a second OCA layer 150 is sandwiched between.

In FIG. 1C, the light A from the light source 120 enters into the light guide plate 110 through the light-entering surface 112 of the light guide plate 110, and irradiates the second light absorption portion 132 of the light-adjusting film 130. The second light absorption portions 132 can absorb the light A and only keep the light C entering into the light guide plate 110.

Figure 2:
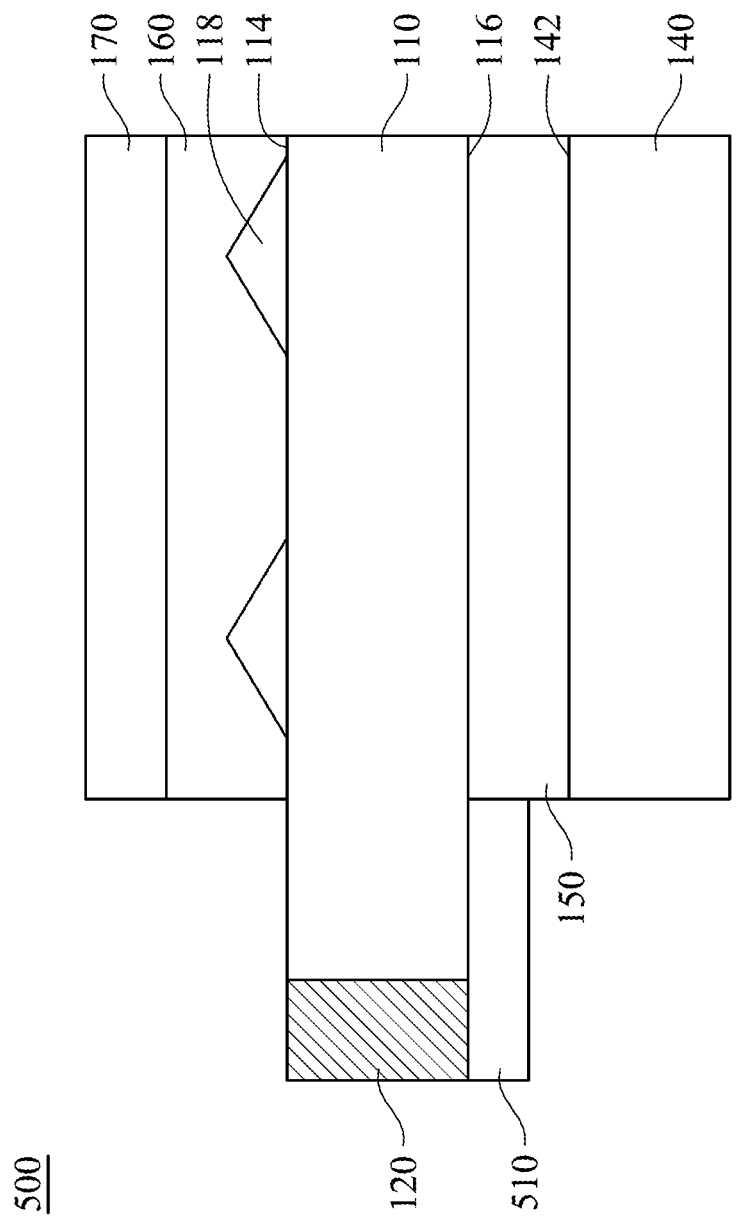
FIG. 2 is a schematic cross-sectional view of a light-emitting module 500 according to one embodiment of the present disclosure.

FIG. 2 is a schematic cross-sectional view of a light-emitting module 500 according to one embodiment of the present disclosure. In FIG. 2, a light-adjusting film 510 is positioned under the light source 120 and the second light-extracting surface 116 of the light guide plate 110. The first light-extracting surface 114 of the light guide plate 110 has an undulating microstructure 118. The first optical clear adhesive (OCA) layer 160 covers the undulating microstructure 118 and the first light-extracting surface 114 of the light guide plate 110, and the transparent protection layer 170 covers the first OCA layer 160. The second light-extracting surface 116 of the light guide plate 110 is toward the display surface 142 of the display unit 140, and the second OCA layer 150 is sandwiched between.

Figure 3:
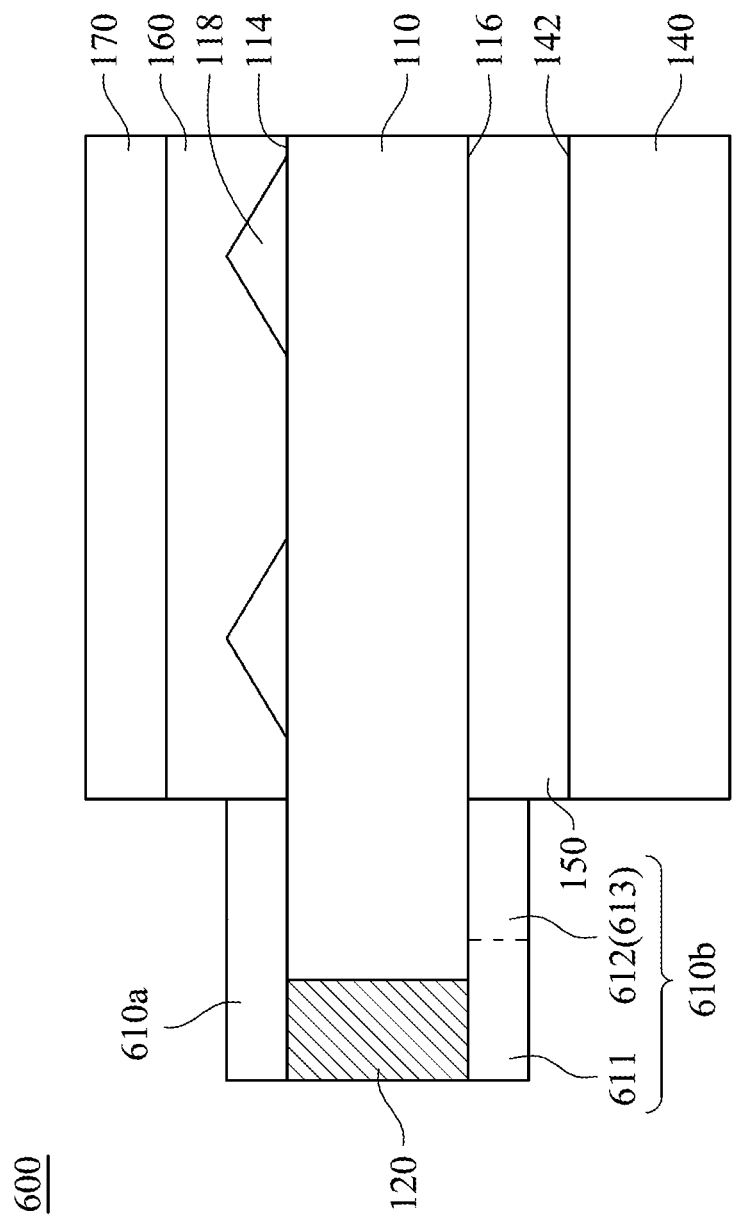
FIG. 3 is a schematic cross-sectional view of a light-emitting module 600 according to one embodiment of the present disclosure.

FIG. 3 is a schematic cross-sectional view of a light-emitting module 600 according to one embodiment of the present disclosure. In FIG. 3, a first light-adjusting film 610*a* is positioned over the light source 120 and the first light-extracting surface 114 of the light guide plate 110; and a second light-adjusting film 610*b* is positioned under the light source 120 and the second light-extracting surface 116 of the light guide plate 110. In an embodiment of the present disclosure, the second light-adjusting film 610*b* has a third light absorption portion 611, a plurality of fourth light absorption portions 612 and a plurality of second light reflection portions 613.

The third light absorption portion 611 is positioned under the light sources 120, and the fourth light absorption portions 612 and the second light reflection portions 613 are positioned on the light-adjusting area of the second light-extracting surface 116 of the first light guide plate 110. The fourth light absorption portions 612 are extended from projection positions 121 of the light sources 120 on the third light absorption portion 611, and one of the second light reflection portions 613 is located between two neighboring fourth light absorption portions 612, such that the fourth light absorption portions 612 and the second light reflection portions 613 are alternately arranged.

In an embodiment of the present disclosure, the second light-adjusting film 610b has a structure as the light-adjusting film 130 shown in FIG. 1. In another embodiment of the present disclosure, the second light reflection portions 613 of the second light-adjusting film 610b has a pattern as the light reflection portion 133 shown in FIG. 1.

In FIG. 3, the first light-extracting surface 114 of the light guide plate 110 has an undulating microstructure 118. The first optical clear adhesive (OCA) layer 160 covers the undulating microstructure 118 and the first light-extracting surface 114 of the light guide plate 110, and the transparent protection layer 170 covers the first OCA layer 160. The second light-extracting surface 116 of the light guide plate 110 is toward the display surface 142 of the display unit 140, and the second OCA layer 150 is sandwiched between.

In embodiments of the present disclosure, the light-emitting module comprises the light guide plate, the light sources and the light-adjusting film. The light-adjusting film has the first light absorption portion, the second light absorption portions and the light reflection portions. The second light absorption portions are extended from projection positions of the light sources on the first light absorption portion, so as to absorb a part of light in front of the light sources to reduce the brightness of highlights. The light reflection portions is located between two neighboring second light absorption portions to reflect a light shining on the first light reflection portions, so as to enhance the brightness of the shadows. Therefore, the light-adjusting film may be used to improve the hot spot of the light-emitting module and have a uniform brightness at a side frame of the display device.

FIG. 4 is a top view of a light-emitting module 700 according to an embodiment of the present invention. FIG. 5 is a cross-sectional view of the light-emitting module 700 in FIG. 4 taken along line 5-5. Please refer to FIG. 4 and FIG. 5, the light-emitting module 700 includes a light guide plate 710, light sources 720a, 720b, and a brightness adjustment element 730. In this embodiment, the brightness adjustment element 730 is a brightness adjustment tape as an example, but the present invention is not limited in this regard. For example, the brightness adjustment element 730 may be the aforementioned light-adjusting film or an ink layer with a light absorption color which is directly inked on the light guide plate 710. The light guide plate 710 has a light incident surface 712, a front surface 714 and a back surface 716 opposite the front surface 714, and the light incident surface 712 is located between the front surface 714 and the back surface 716 and is adjacent to the front surface 714 and the back surface 716. The light sources 720a, 720b are located outside the light guide plate 710, and the light sources 720a, 720b face the light incident surface 712 of the light guide plate 710. The light sources 720a, 720b can be point light sources, such as LEDs. The front surface 714 and the back surface 716 of the light guide plate 710 can be used as the light exit surface of the light guide plate 710. For example, when the light-emitting module 700 is applied to a LCD, the light-emitting module 700 is the backlight module, and the front surface 714 of the light guide plate 710 is the light exit surface, above which a LCD panel can be disposed. When the light-emitting module 700 is applied to the EPD, the light-emitting module 700 is the front light module, and the back surface 716 of the light guide plate 710 is the light exit surface, below which an EPD panel can be disposed.

The brightness adjustment element 730 is located on the back surface 716 of the light guide plate 710, however, in other embodiment, the brightness adjustment element 730 can be located on the front surface 714 of the light guide plate 710, and the present invention is not limited in this regard. The brightness adjustment element 730 includes a strip portion 732 and a protruding portion 734. A length direction of the strip portion 732 is the same as that of the light incident surface 712 of the light guide plate 710 (both are direction D). The strip portion 732 has a first edge 731 proximal to the light incident surface 712. The protruding portion 734 is located on the first edge 731 of the strip portion 732. In addition, the protruding portion 734 is respectively substantially aligned with the light sources 720a and 720b (as shown in FIG. 4), and the protruding portion 734 respectively extends towards the light sources 720a and 720b. In this embodiment, the shape of the protruding portion 734 is semi-circular or semi-elliptical, however, in other embodiments, the shape of the protruding portion 734 can be rectangular, triangular, or trapezoidal, and the present invention is not limited in this regard.

When the light sources 720a and 720b emit light, since the protruding portion 734 of the brightness adjustment element 730 is respectively aligned with the light sources 720a and 720b, and the protruding portion 734 extends toward the light sources 720a and 720b, the protruding portion 734 can absorb the light in the high energy areas in front of the light sources 720a and 720b, to avoid light area being generated in the light guide plate 710 in the area in front of the light sources 720a and 720b. Since the brightness adjustment element 730 has a strip portion 732 connecting to the protruding portion 734, the brightness adjustment element 730 can be easily disposed on the light guide plate 710, to promote the assembly convenience.

In this embodiment, a distance d1 between the protruding portion 734 and the light source 720a (or between the protruding portion 734 and the light source 720b) may be in a range from 4 mm to 6 mm (e.g., 5 mm), to make the protruding portion 734 effectively absorb the light in front of the light sources 720a and 720b.

In addition, the strip portion 732 can further ensure the light guide plate 710 at the right side (e.g., the visual area 717 in FIG. 4) an even brightness distribution, to avoid the light guide plate 710 having uneven light fringes due to the existence of the protruding portion 734, the cutting tolerance of the tape, or the attachment tolerance of the tape, for making the design of the brightness adjustment element 730 more flexible. As a result, by the design of the protruding portion 734 to make different portions of the brightness adjustment element 730 with different absorbing degree, thus the brightness adjustment element 730 can make the energy evenly distributed at each position when the light transmits to the visual area 717 of the light guide plate 710, and decrease the hot spot mura.

In this embodiment, the strip portion 732 has a second edge 733 opposite the first edge 731. A distance d2 between the first edge 731 and the second edge 733 may be in a range from 1 mm to 3 mm (e.g., 3 mm), to avoid over absorbing light and effecting the whole brightness of the light guide plate 710.

The brightness adjustment element 730 has an adhesive layer 736 and a light absorbing layer 738. The adhesive layer 736 is located between the light absorbing layer 738 and the back surface 716 of the light guide plate 710. A difference between the refractive index of the adhesive layer 736 and the refractive index of the light guide plate 710 may be in a range from 0.1 to 0.7. For example, the refractive index of the light guide plate 710 is 1.58, and the refractive index of air is 1, if there is no brightness adjustment element 730, then a critical angle of light is 39.2°. If the light guide plate 710 has a brightness adjustment element 730, and a refractive index of the adhesive layer 736 is 1.52, then the critical angle of light can be increased to 74°, that is, all the light with a light-emitting angle less than 74° (e.g., the light L1) can be refracted through the light guide plate 710 to the adhesive layer 736 (e.g., formed the light L2), and then absorbed by the light absorbing layer 738. That is, the brightness adjustment element 730 can destroy the total reflection in the high energy area of light guide plate 710. In this embodiment, the color of the brightness adjustment element 730 can be dark (e.g., black), to help the absorption of the light.

In this embodiment, the light sources 720a and 720b respectively connect to the driving elements 702a and 702b, since the light sources 720a and 720b are different circuit loops, the light sources 720a and 720b can be respectively turned on or turned off by the driving elements 702a and 702b. In FIG. 4, an amount of the light sources 720a is 3, which can be viewed as the first portion of the light source, and an amount of the light sources 720b is 2, which can be viewed as the second portion of the light source. The light source 720a can have a first color temperature (e.g., 6000K), and the light source 720b can have a second color temperature (e.g., 4000K). Or, the light source 720a can have a first color (e.g., deep red), and the light source 720b can have a second color (e.g., blue). Since the locations of the protruding portion 734 of the brightness adjustment element 730 respectively corresponds to the locations of the light sources 720a and 720b, the light in front of each of the light sources 720a and 720b will be absorbed by the protruding portion 734 at the corresponding location. In this invention, when it refers to "correspondence" of two positions, it means they approximately aligned with each other. When the light source 720a is turned on and the light source 720b is turned off, the light in front of the light source 720a will be absorbed by the protruding portion 734 aligned with the light source 720a, and the protruding portion 734 aligned with the light source 720b would not affect the light emitted from the light source 720a. When the light source 720b is turned on and the light source 720a is turned off, the light in front of the light source 720b will be absorbed by the protruding portion 734 aligned with the light source 720b, and the protruding portion 734 aligned with the light source 720a will not affect the light emitted from the light source 720b.

It should be appreciated that the aforementioned relationship and functions of the components will not be described again. In the following descriptions, other types of light guide assemblies will be described.

FIG. 6 is a cross-sectional view of a light-emitting module 700a according to an embodiment of the present invention. The difference between this embodiment and the embodiment in FIG. 5 is that: the brightness adjustment element 730 in FIG. 6 is located on the front surface 714 of the light guide plate 710. The design of the light-emitting module 700a in this embodiment will still have the function as that of the light-emitting module 700 in FIG. 4 and FIG. 5.

Figure 7:
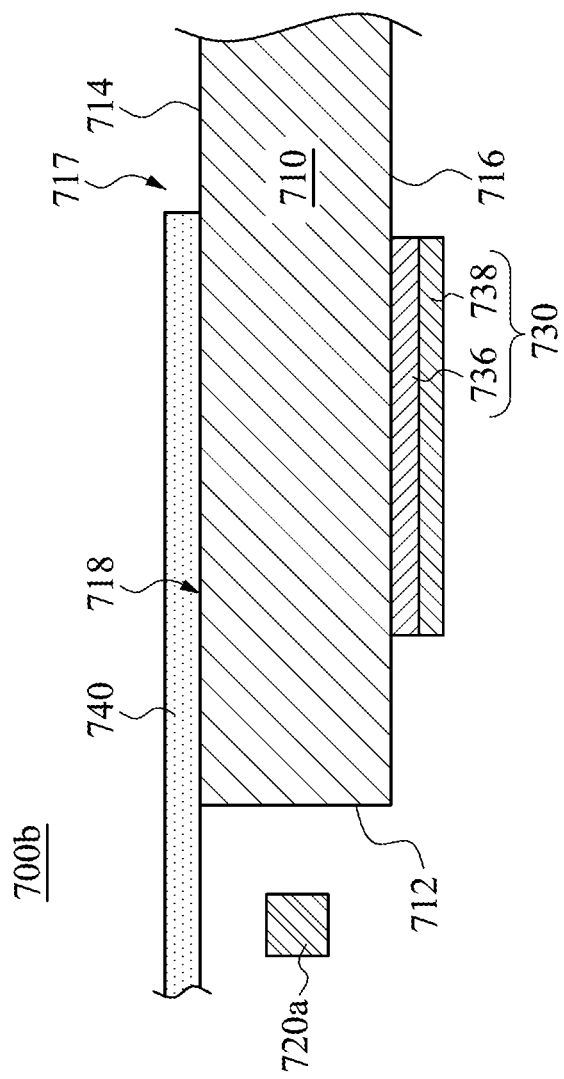
FIG. 7 is a cross-sectional view of a light-emitting module according to an embodiment of the present invention.

FIG. 7 is a cross-sectional view of a light-emitting module 700b according to an embodiment of the present invention. The difference between this embodiment and the embodiment in FIG. 5 is that: the light-emitting module 700b further includes a cover 740. An area of the light guide plate 710 covered by the cover 740 is a shaded area 718, and the area which is not covered by the cover 740 is a visual area 717. The cover 740 covers the brightness adjustment element 730, the light source 720a and the shaded area 718 of the light guide plate 710. In other words, the cover 740 is overlapped with the brightness adjustment element 730, the light source 720a, and the shaded area 718 of the light guide plate 710. Therefore, the brightness adjustment element 730 is located in the shaded area 718 of the light guide plate 710. The brightness adjustment element 730 ensures the light of the light source 720a has an even brightness when it transmits to the visual area 717 of the light guide plate 710.

Figure 8:
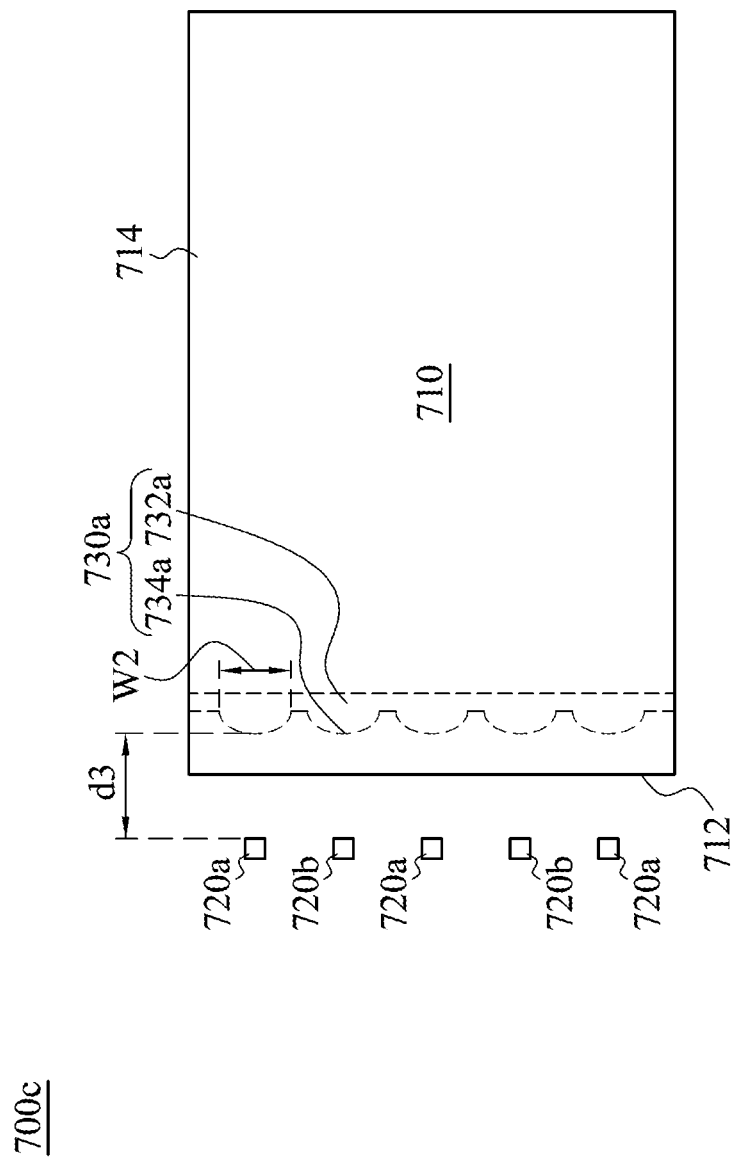
FIG. 8 is a top view of a light-emitting module according to an embodiment of the present invention.

FIG. 8 is a top view of a light-emitting module 700c according to an embodiment of the present invention. For simplicity, the driving elements 702a, 702b in FIG. 4 will be omitted from FIG. 8 to FIG. 12. The difference between this embodiment and the embodiment in FIG. 4 is that: a distance d3 between the protruding portion 734a and the light source 720a (or between the protruding portion 734a and the light source 720b) is greater than the distance d1 in FIG. 4, and a width W2 of the protruding portion 734a is wider than a width W1 of the protruding portion 734 in FIG. 4. Since the distance d3 in FIG. 8 is greater than the distance d1 in FIG. 4, a range of the light emitted from the light sources 720a, 720b to the brightness adjustment element 730a will be larger than a range of the light transmitted to the brightness adjustment element 730. In this embodiment, the protruding portion 734a with a greater width W2 ensures a larger range of the light in front of the light sources 720a and 720b can be absorbed.

Figure 9:
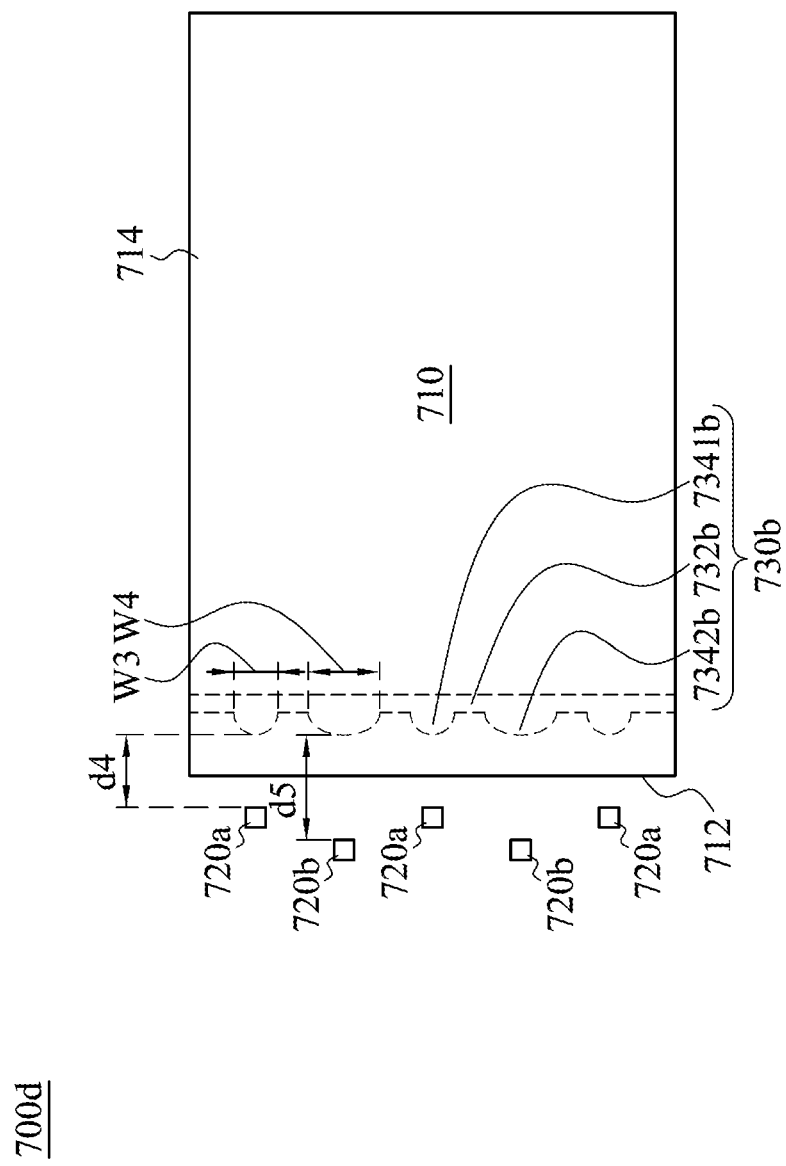
FIG. 9 is a top view of a light-emitting module according to an embodiment of the present invention.

FIG. 9 is a top view of a light-emitting module 700d according to an embodiment of the present invention. The difference between this embodiment and the embodiment in FIG. 4 is that: a distance between the light source 720a and the light guide plate 710 is different from a distance between the light source 720b and the light guide plate 710, and the brightness adjustment element 730b has the protruding portions 7341b and 7342b with different widths. In this embodiment, a distance d4 between the protruding portion 7341b and the light source 720a is shorter than a distance d5 between the protruding portion 7342b and the light source 720b, and a width W3 of the protruding portion 7341b is less than a width W4 of the protruding portion 7342b. That is, the width of the protruding portion increase as the distance between the light source and the protruding portion increases. Since the distance d5 is longer that the distance d4, a range of the light emitted from the light source 720b to the brightness adjustment element 730b will be greater than a range of the light emitted from the light source 720a to the brightness adjustment element 730b. In this embodiment, the protruding portion 7342b with a greater width W4 ensures a larger range of the light in front of the light source 720b can be absorbed.

Figure 10:
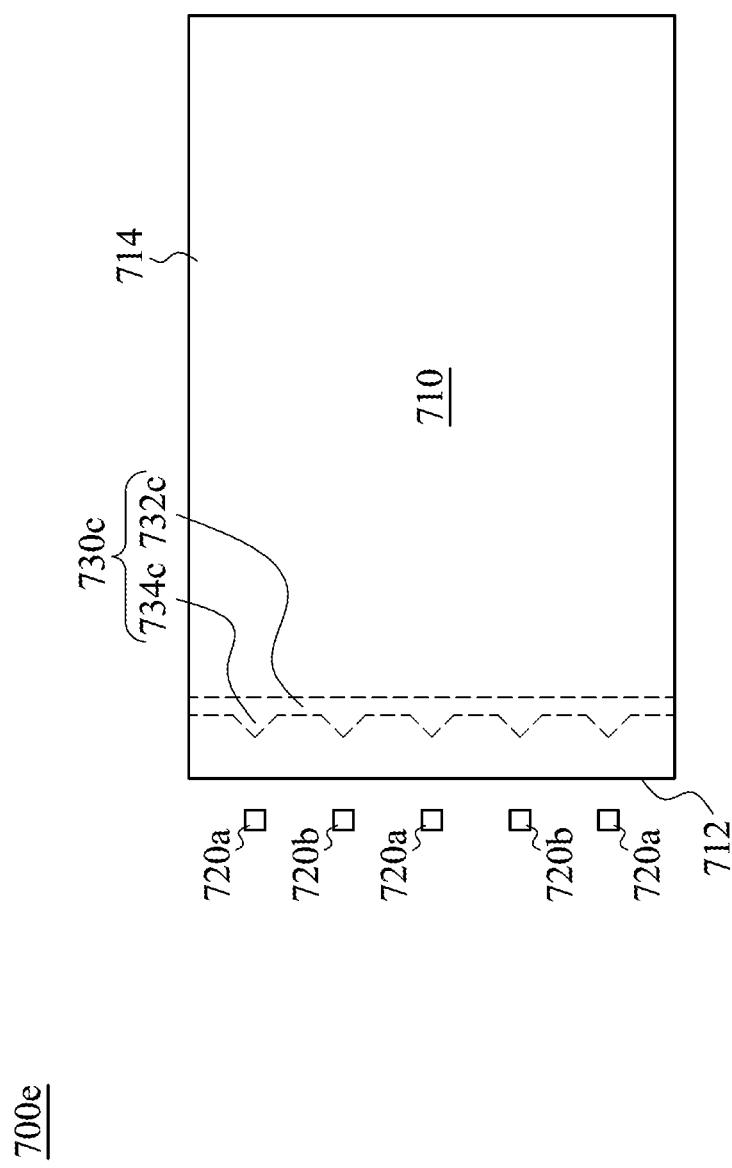
FIG. 10 is a top view of a light-emitting module according to an embodiment of the present invention.

FIG. 10 is a top view of a light-emitting module 700e according to an embodiment of the present invention. The light-emitting module 700e includes a light guide plate 710, light sources 720a and 720b, and a brightness adjustment element tape 730c. The brightness adjustment element 730c has a strip portion 732c and a protruding portion 734c connecting to the strip portion 732c. The difference between this embodiment and the embodiment in FIG. 4 is that: a shape of the protruding portion 734c of the brightness adjustment element 730c is triangular.

Figure 11:
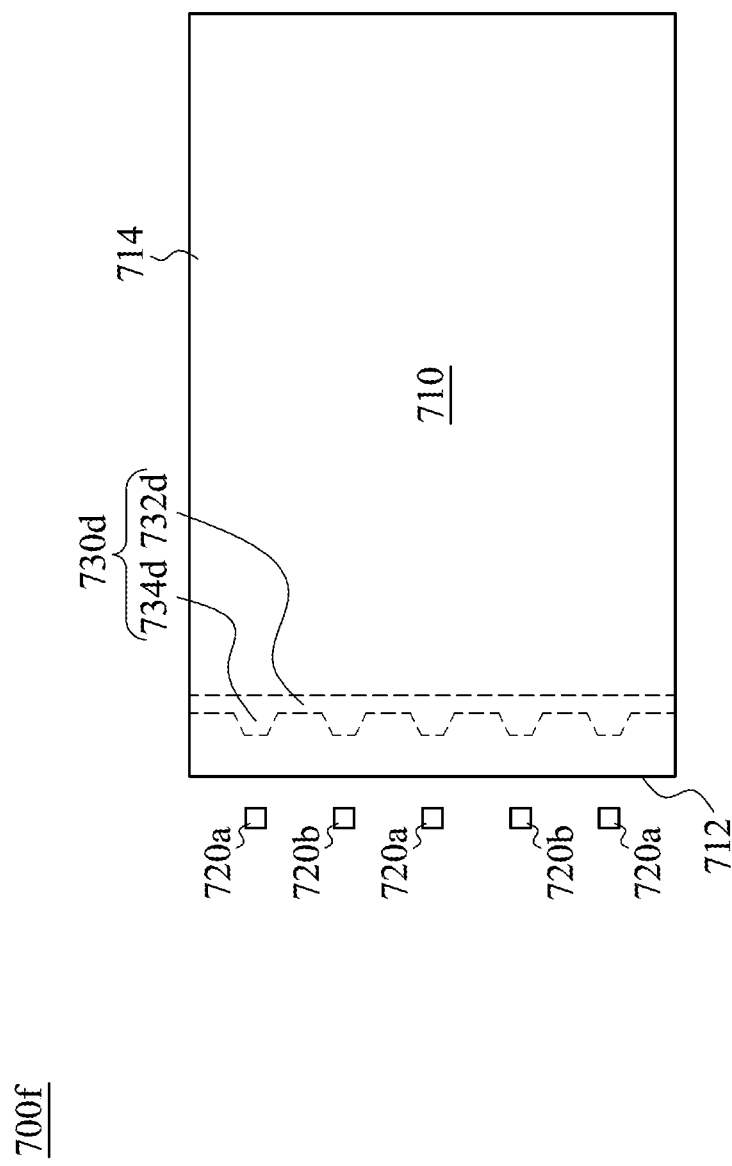
FIG. 11 is a top view of a light-emitting module according to an embodiment of the present invention.

FIG. 11 is a top view of a light-emitting module 700f according to an embodiment of the present invention. The light-emitting module 700f includes a light guide plate 710, light sources 720a and 720b, and a brightness adjustment element 730d. The brightness adjustment element 730d has a strip portion 732d and a protruding portion 734d connecting to the strip portion 732d. The difference between this embodiment and the embodiment in FIG. 4 is that: a shape of the protruding portion 734d of the brightness adjustment element 730d is trapezoidal.

Figure 12:
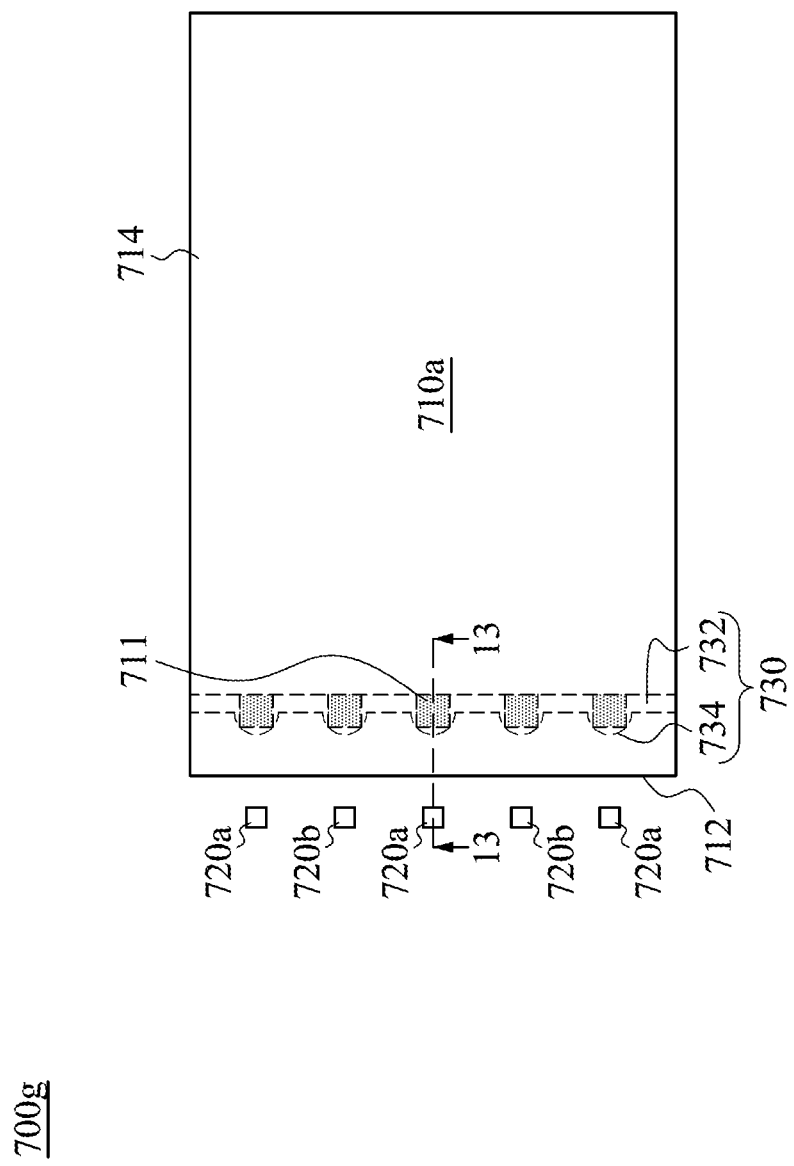
FIG. 12 is a top view of a light-emitting module according to an embodiment of the present invention.

FIG. 12 is a top view of a light-emitting module 700g according to an embodiment of the present invention. FIG. 13 is a cross-sectional view of the light-emitting module 700g in FIG. 12 taken along line 16-16. Please refer to FIG. 12 and FIG. 13. The difference between this embodiment and the embodiment in FIG. 4 is that: the light guide plate 710a further includes a microstructure region 711. When the brightness adjustment element 730 is located on the back surface 716 of the light guide plate 710a, the microstructure region 711 is located on the back surface 716 and is covered by the brightness adjustment element 730. In other words, the microstructure region 711 and the brightness adjustment element 730 are located on the same surface of the light guide plate 710a. In this embodiment, a shape of the microstructure region 711 can be rectangular, but the present invention is not limited in this regard. The location of the microstructure region 711 respectively corresponds to the locations of the light sources 720a and 720b. There are a plurality of bumps in the microstructure region 711, which can destroy the total reflection in the light guide plate 710a for increasing the light emitting from the light guide plate 710a (e.g., the light L3 emitted from the microstructure region 711 forms the light L4), and the light will be absorbed by the light absorbing layer 738, to promote the brightness uniformity of the light guide plate 710a.

In other embodiments, the brightness adjustment element 730 can be located on the front surface 714 of the light guide plate 710a, and the microstructure region 711 is located on the front surface 714 and is covered by the brightness adjustment element 730. In addition, the shape of the microstructure region 711 can vary. The shape can be, for example, the circular microstructure region 711a in FIG. 14A, the elliptical microstructure region 711b in FIG. 14B, the triangular microstructure region 711c in FIG. 14C, or the trapezoidal microstructure region 711d in FIG. 14D.

Figure 15:
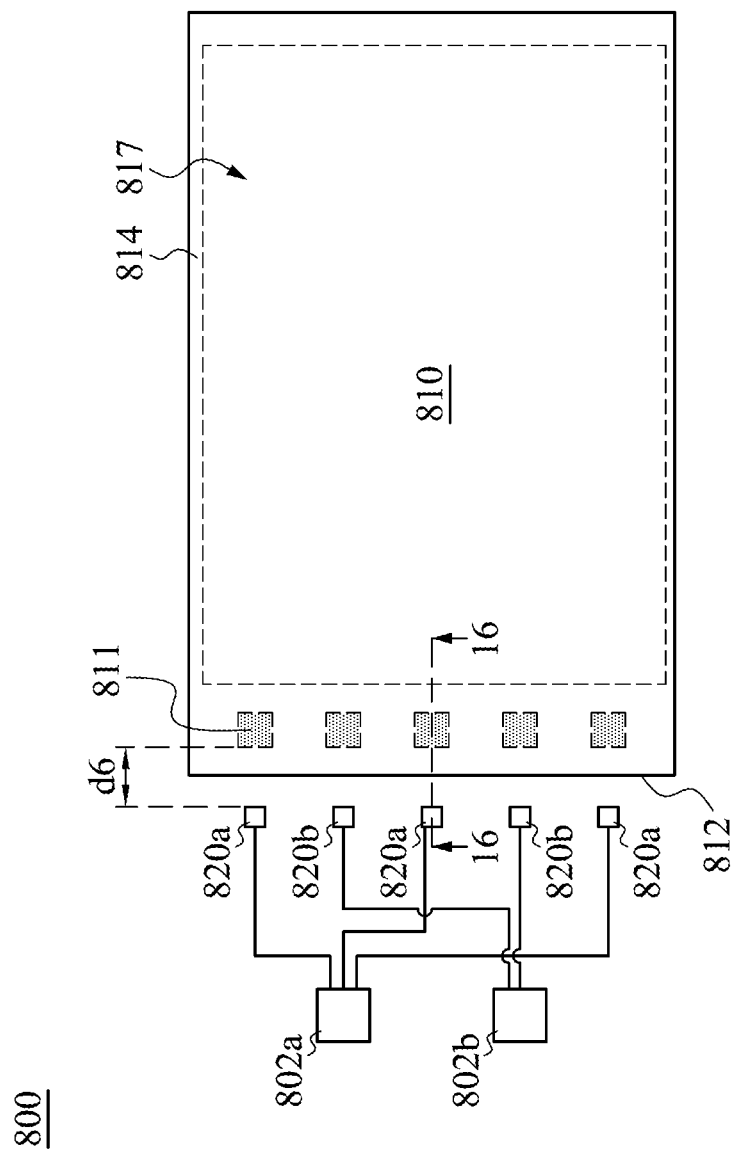
FIG. 15 is a top view of a light-emitting module according to an embodiment of the present invention.

FIG. 15 is a top view of a light-emitting module 800 according to an embodiment of the present invention. FIG. 16 is a cross-sectional view of the light-emitting module 800 in FIG. 15 taken along line 16-16. Please refer to FIG. 15 and FIG. 16, the light-emitting module 800 includes a light guide plate 810, and light sources 820a and 820b. The light guide plate 810 has at least one microstructure region 811, a light incident surface 812, a front surface 814, and a back surface 816 opposite the front surface 814. The light incident surface 812 is located between the front surface 814 and the back surface 816, and is adjacent to the front surface 814 and the back surface 816. In this embodiment, the microstructure region 811 is located on back surface 816 of the light guide plate 810. However, in other embodiments, the microstructure region 811 can be located on the front surface 814 of the light guide plate 810, and the present invention is not limited in this regard. The microstructure region 811 is proximal to the light incident surface 812 and is substantially aligned with the light sources 820a and 820b. The microstructure region 811 has a plurality of microstructures to allow the passage of light. In this embodiment, the microstructure region 811 can have a plurality of bumps, but the present invention is not limited in this regard, for example, the microstructure region 811 can have a plurality of pits (not shown).

The light sources 820a, 820b are located outside the light guide plate 810, and the light sources 820a, 820b face the light incident surface 812 of the light guide plate 810. The light sources 820a, 820b can be point light sources, such as LEDs. The front surface 814 and the back surface 816 of the light guide plate 810 can be used as the light exit surfaces of the light guide plate 810. For example, when the light-emitting module 800 is applied to LCDs, the light-emitting module 800 is a backlight module, the front surface 814 of the light guide plate 810 is a light exit surface, and above which a LCD panel can be disposed. When the light-emitting module 800 is applied to EPDs, the light-emitting module 800 is a front light module, and the back surface 816 of the light guide plate 810 is a light exit surface, below which an EPD panel can be disposed.

When the light sources 820a and 820b emit light, since the microstructure region 811 is located on the light guide plate 810 respectively aligned with the light sources 820a and 820b, the microstructure region 811 having microstructures thus can destroy the total reflection of the light, to make the light refract at and exit from the microstructure region 811 for avoiding the light area being generated in the light guide plate 810 in front of the light sources 820a and 820b. For example, when the light L5 transmits to the microstructure region 811 of the back surface 816, the light L5 will refract at and exit from the microstructure region 811 to form the light L6, there will be no total reflection in the light guide plate 810. By the design of the microstructure region 811, the light guide plate 810 can reduce the energy in the area close to the light sources 820a, and 820b, to make the energy evenly distributed to each position when the light transmits to the visual area 817 of the light guide plate 810, and decrease the hot spot mura.

A distance d6 between the microstructure region 811 and the light incident surface 812 of the light guide plate 810 may be in a range from 1 mm to 5 mm, to make the microstructure region 811 effectively destroy the total reflection in the area in front of the light sources 820a and 820b. In this embodiment, shapes of the microstructures in the microstructure region 811 can be rectangular or square, however, in other embodiments, the shapes of the microstructures in the microstructure region 811 can be circular, elliptical, triangular, or trapezoidal, and the present invention is not limited in this regard.

In this embodiment, the light sources 820a and 820b are respectively connected to each of the driving elements 802a and 802b, therefore, the light sources 820a and 820b belong to different circuit loops and cane be separately turned on/off by the driving elements 802a and 802b. In FIG. 15, an amount of the light sources 820a is 3, and which can be viewed as the first portion of the light source; an amount of the light source 820b is 2, which can be viewed as the second portion of the light source. The light source 820a can have a first color temperature (e.g., 6000K), and the light source 820b can have a second color temperature (e.g., 4000K). Or, the light source 820a can have a first color (e.g., red), and the light source 820b can have a second color (e.g., blue). Since the location of the microstructure region 811 of the light guide plate 810 respectively corresponds to the locations of the light sources 820a and 820b, the light in front of each of the light sources 820a and 820b can refract at and exit from the corresponding positions of the microstructure region 811. In this invention, when it refers to "correspondence" of two positions, it means they approximately aligned with each other. When the light source 820a is turned on and the light source 820b is off, the light in front of the light source 820a will refract at and exit from the microstructure region 811 aligned with the light source 820a, and the microstructure region 811 aligned with the light source 820b will not affect the light of the light source 820a. when the light source 820b is turned on, and the light source 820a is off, the light in front of the light source 820b will refract at and exit from the microstructure region 811 aligned with the light source 820b, and the microstructure region 811 aligned with the light source 820a will not affect the light of the light source 820b.

It should be appreciated that the aforementioned relationships and functions of the components will not be described again. In the following descriptions, other types of light guide assemblies will be described.

FIG. 17 is a cross-sectional view of a light-emitting module 800a according to an embodiment of the present invention. The difference between this embodiment and the embodiment in FIG. 16 is that: the microstructure region 811a in FIG. 17 is located on the front surface 814a of the light guide plate 810a. By this design, the light-emitting module 800a can still have the functions as the light-emitting module 800 mentioned in FIG. 15 and FIG. 16.

Figure 18:
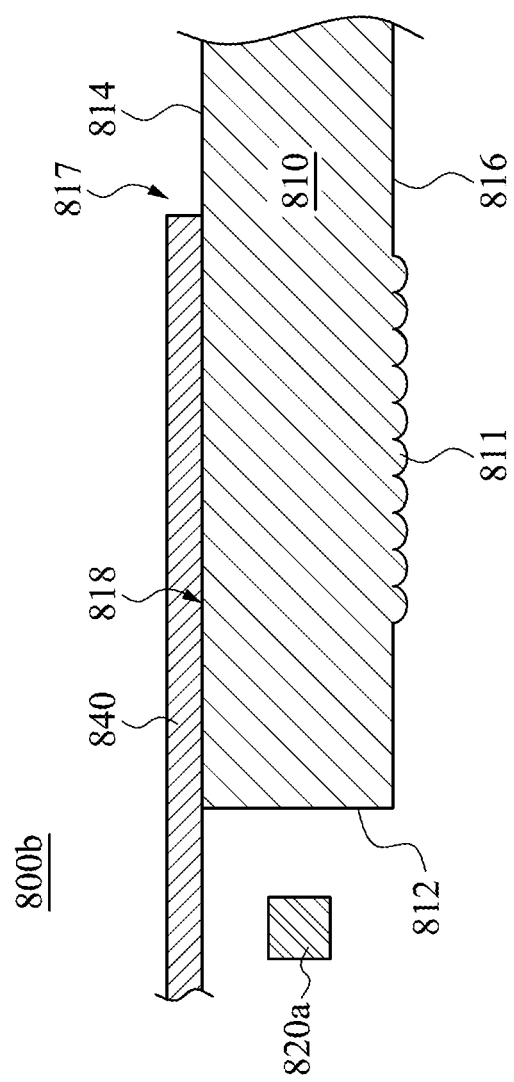
FIG. 18 is a cross-sectional view of a light-emitting module according to an embodiment of the present invention.

FIG. 18 is a cross-sectional view of a light-emitting module 800b according to an embodiment of the present invention. The difference between this embodiment and the embodiment in FIG. 16 is that: the light-emitting module 800b further includes a cover 840. The portion of the light guide plate 810 which is covered by the cover 840 is the shaded area 818, and the portion which is not covered by the cover 840 is the visual area 817. The cover 840 covers the light source 820a, the microstructure region 811 of the light guide plate 810, and the shaded area 818. That is, the cover 840 is overlapped with the light source 820a, the shaded area 818 of the light guide plate 810, and the microstructure region 811. The microstructure region 811 of the light guide plate 810 is located in the shaded area 818, and the microstructure region 811 ensures the light of the light source 820a with an evenly brightness when it transmits to the visual area 817 of the light guide plate 810.

Figure 19:
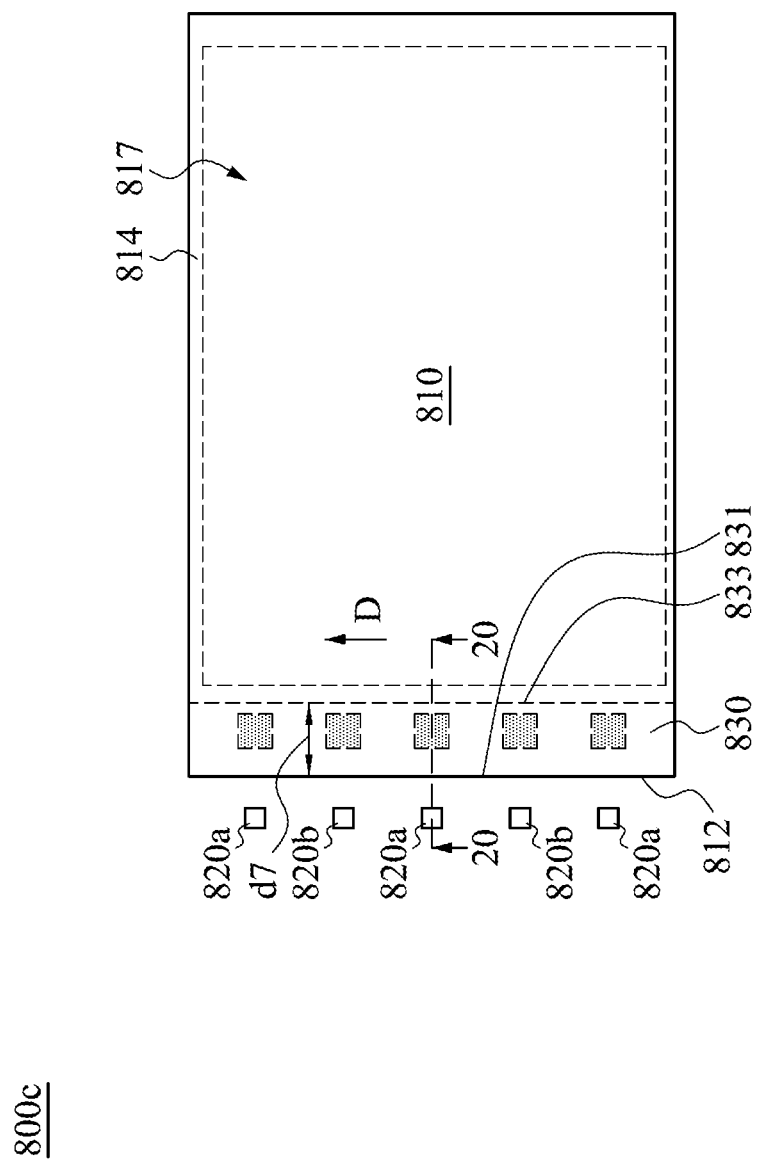
FIG. 19 is a top view of a light-emitting module according to an embodiment of the present invention.
Figure 20:
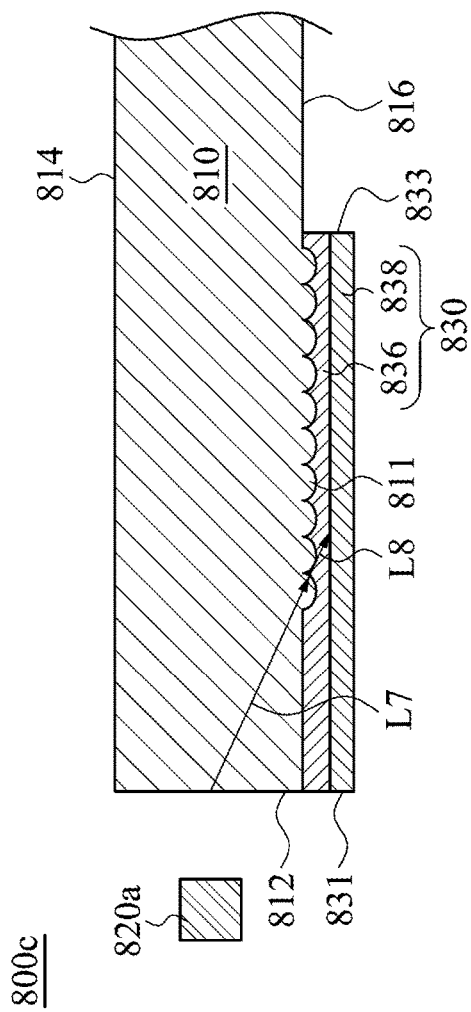
FIG. 20 is a cross-sectional view of the light-emitting module in FIG. 19 taken along line 20-20.

FIG. 19 is a top view of a light-emitting module 800c according to an embodiment of the present invention. FIG. 20 is a cross-sectional view of the light-emitting module 800c in FIG. 19 taken along line 20-20. For simplicity, the driving elements 802a, 802b in FIG. 15 will be omitted from FIG. 19 to FIG. 27. Please refer to FIG. 19 and FIG. 20, the light-emitting module 800c includes a light guide plate 810 and light sources 820a, and 820b. The difference between this embodiment and the embodiment in FIG. 15 and FIG. 16 is that: the light-emitting module 800c further includes a brightness adjustment element 830. In this embodiment, the microstructure region 811 is located on the back surface 816 of the light guide plate 810, the brightness adjustment element 830 is located on the back surface 816 covers the microstructure region 811. The brightness adjustment element 830 has an adhesive layer 836 and a light absorbing layer 838. The adhesive layer 836 is located between the light absorbing layer 838 and the back surface 816 of the light guide plate 810. The difference between a refractive index of the adhesive layer 836 and a refractive index of the light guide plate 810 is in a range from 0.1 to 0.7. For example, since the refractive index of the light guide plate 810 is 1.58, and the refractive index of air is 1, if a refractive index of the adhesive layer 836 is 1.52, then the critical angle of light can be increased, to make all the light with a light-emitting angle less than the critical angle (e.g., the light L7) can be refracted through the light guide plate 810 to the adhesive layer 836 (e.g., to form the light L8), and then absorbed by the light absorbing layer 838. In this embodiment, the color of the light absorbing layer 838 can be dark (e.g., black), to help the absorption of the light.

Both the brightness adjustment element 830 and the microstructure region 811 can destroy the total reflection in the high energy area of the light guide plate 810, and make the brightness adjustment element 830 and the area of the light guide plate 810 at the right side of the microstructure region 811 (e.g., the visual area 817 which is not covered) an evenly distributed brightness. In addition, the brightness adjustment element 830 can avoid the light guide plate 810 having uneven light fringes due to the assembly tolerance of the light sources 820a and 820b, the manufacture tolerance of the microstructure region 811, and to solve the light leakage due to the light exited from the microstructure region 811.

In this embodiment, a length direction of the brightness adjustment element 830 is the same as a length direction of the light incident surface 812 of the light guide plate 810 (both are direction D), and a length of the brightness adjustment element 830 is approximately the same as a width of the light guide plate 810. The brightness adjustment element 830 has a first edge 831 and a second edge 833 opposite the first edge 831. The first edge 831 of the brightness adjustment element 830 is adjacent to the light incident surface 812 of the light guide plate 810, and a distance d7 between the first edge 831 and the second edge 833 is larger than or equal to a width of the microstructure region 811, hence it can cover the microstructure region 811. In an embodiment, the distance d7 is in a range from 3 mm to 7 mm, to make the brightness adjustment element 830 not only effectively destroy the total reflection in the high energy area of the light guide plate 810, but also avoid the total brightness of the light guide plate 810 being affected due to over absorption of the light.

Figure 21:
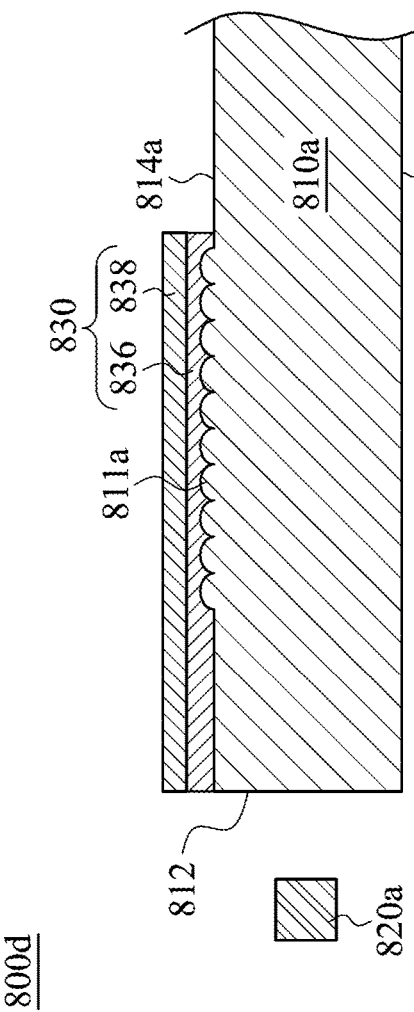
FIG. 21 is a cross-sectional view of a light-emitting module according to an embodiment of the present invention.

FIG. 21 is a cross-sectional view of a light-emitting module 800d according to an embodiment of the present invention. The difference between this embodiment and the embodiment in FIG. 20 is that: the microstructure region 811a of the light-emitting module 810a is located on the front surface 814a of the light guide plate 810a, and the brightness adjustment element 830 is located on the front surface 814a of the light guide plate 810a, and covers the microstructure region 811a. The design can make the light-emitting module 800d having the functions as the functions of the light-emitting module 800c in FIG. 19 and FIG. 20.

Figure 22:
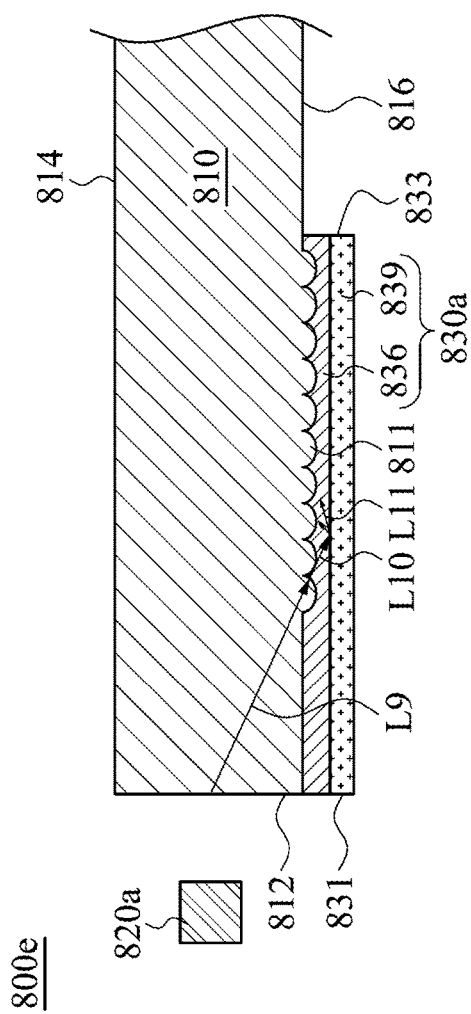
FIG. 22 is a cross-sectional view of a light-emitting module according to an embodiment of the present invention.

FIG. 22 is a cross-sectional view of a light-emitting module 800e according to an embodiment of the present invention. The difference between this embodiment and the embodiment in FIG. 20 is that: the brightness adjustment element 830a has an adhesive layer 836 and a scattering layer 839, and the adhesive layer 836 is located between the scattering layer 839 and the light guide plate 810. In this embodiment, the microstructure region 811 is located on the back surface 816 of the light guide plate 810, and the brightness adjustment element 830a is located on the back surface 816 and covers the microstructure region 811. A difference between the refractive index of the adhesive layer 836 and the refractive index of the light guide plate 810 can be in a range from 0.1 to 0.7. The adhesive layer 836 can further increase the critical angle of the light guide plate 810, to make the light smaller than the critical angle (e.g., light L9) to refract at and exit from the light guide plate 810 to the adhesive layer 836 (e.g., to form the light L10), and then scattered by the scattering layer 839 and atomized (e.g., form a plurality of lights L11), makes the brightness adjustment element 830a and the light guide plate 810 at the right side of the microstructure region 811 an evenly distributed brightness. In this embodiment, the scattering layer 839 can be light (e.g., white), to help the scattering and the atomizing of the light.

Figure 23:
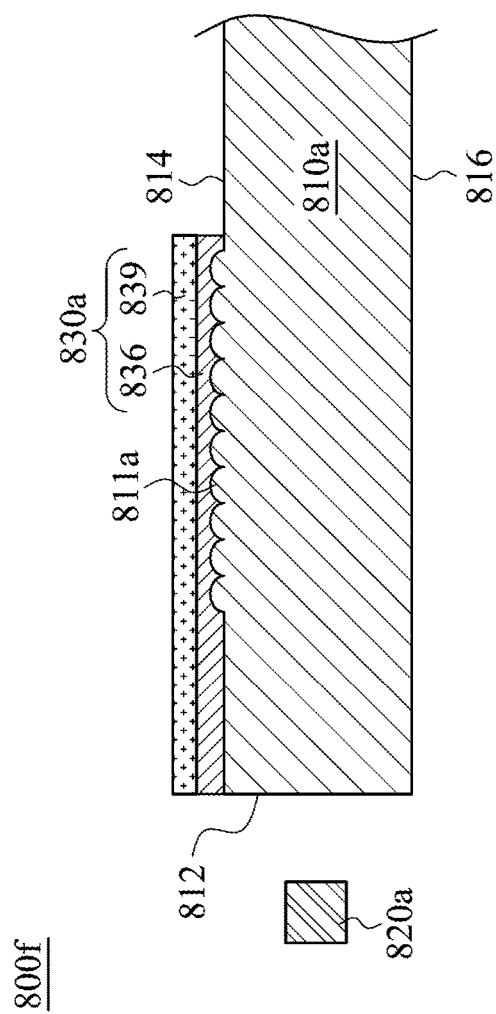
FIG. 23 is a cross-sectional view of a light-emitting module according to an embodiment of the present invention.

FIG. 23 is a cross-sectional view of a light-emitting module 800f according to an embodiment of the present invention. The difference between this embodiment and the embodiment in FIG. 22 is that: the microstructure region 811a of the light guide plate 810a is located on the front surface 814a of the light guide plate 810a, and the brightness adjustment element 830a is located on the front surface 814a of the light guide plate 810a and covers the microstructure region 811a. By the design, the light-emitting module 800f can still has the functions as the functions mentioned in the light-emitting module 800e of aforementioned FIG. 22.

Figure 24:
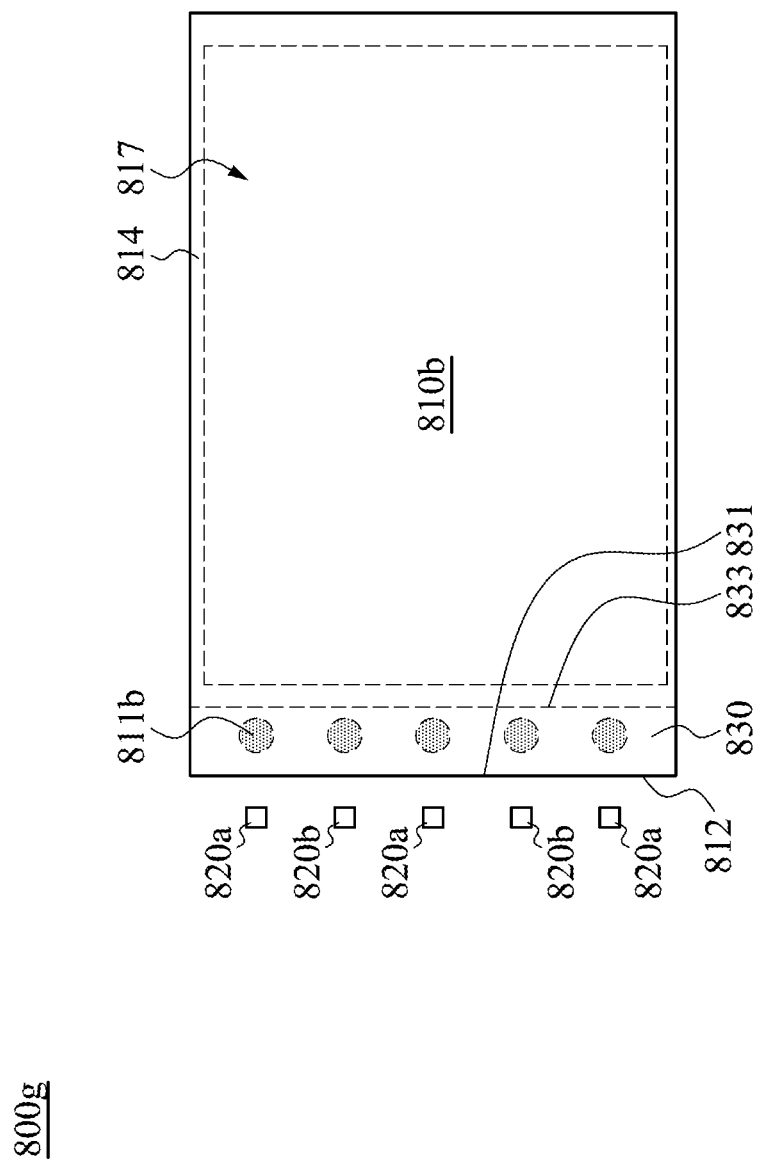
FIG. 24 is a top view of a light-emitting module according to an embodiment of the present invention.
Figure 25:
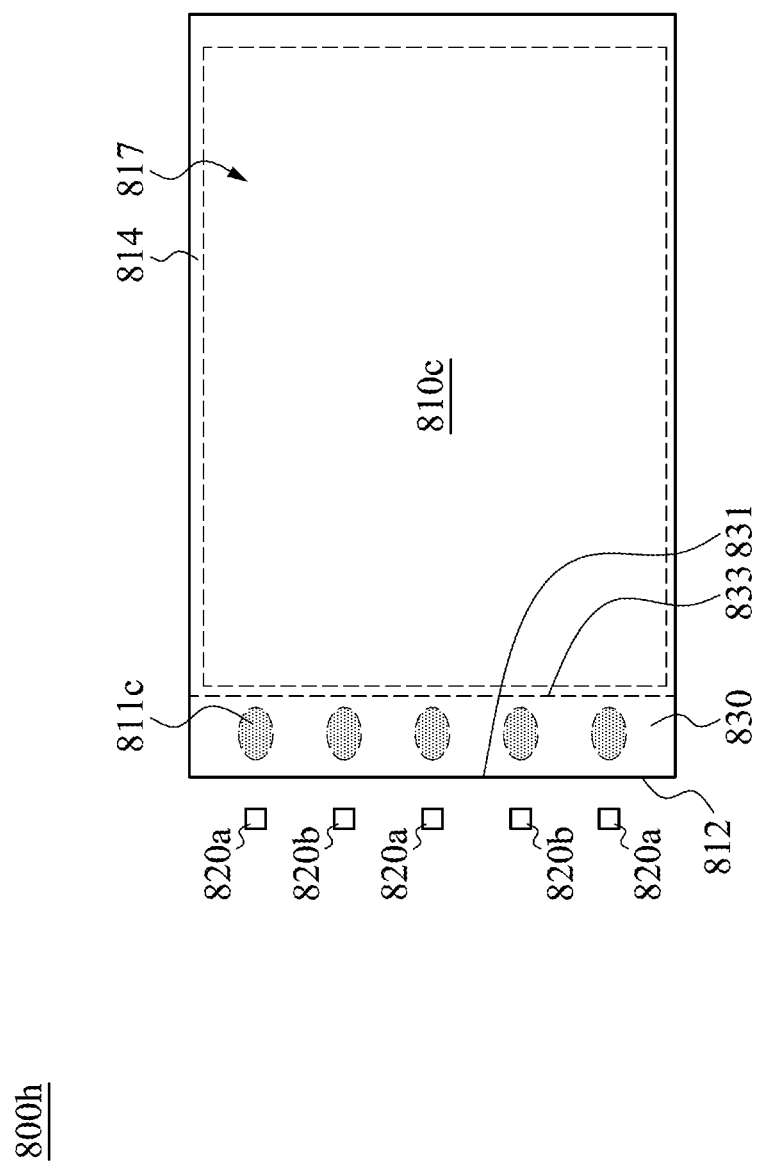
FIG. 25 is a top view of a light-emitting module according to an embodiment of the present invention.
Figure 26:
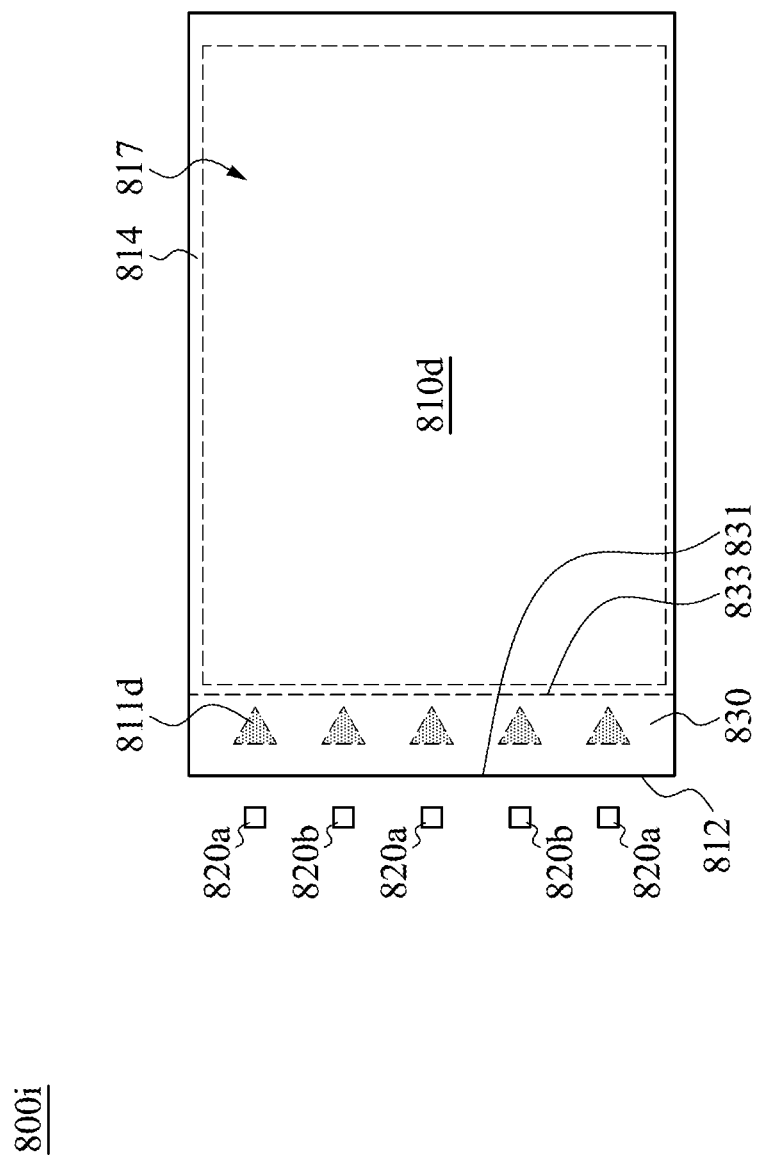
FIG. 26 is a top view of a light-emitting module according to an embodiment of the present invention.
Figure 27:
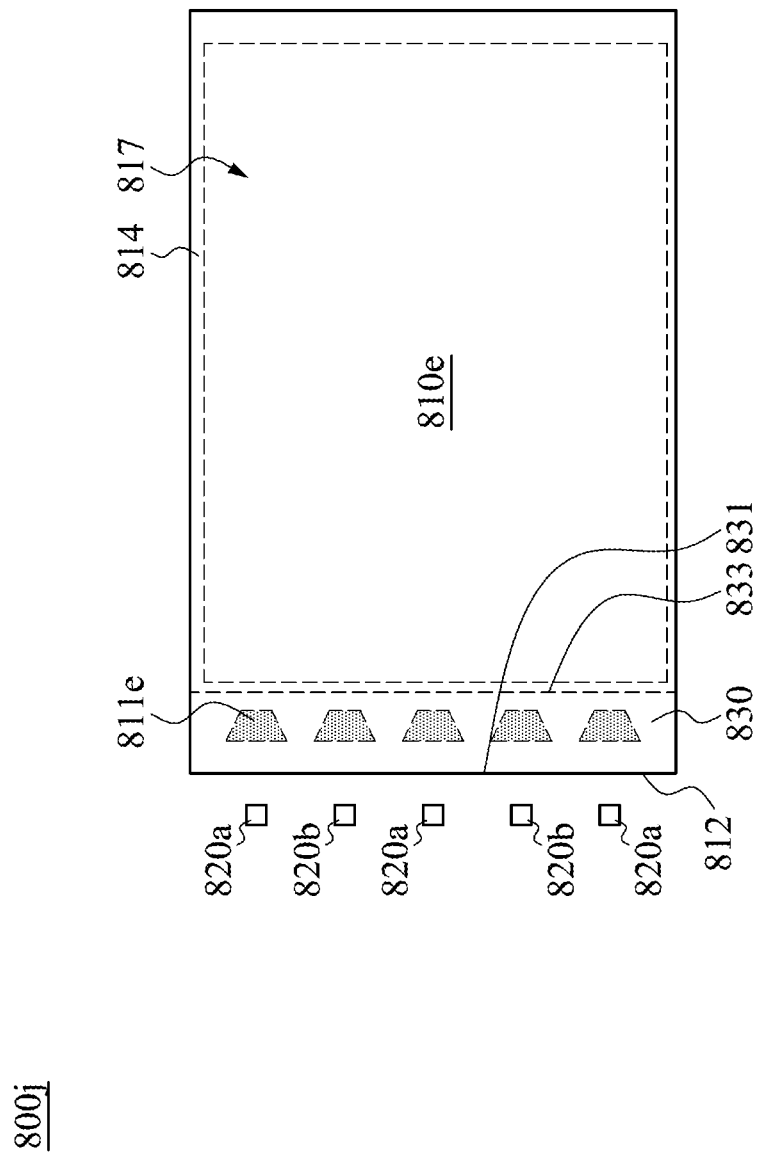
FIG. 27 is a top view of a light-emitting module according to an embodiment of the present invention.

FIG. 24 is a top view of a light-emitting module 800g according to an embodiment of the present invention. The light-emitting module 800g includes a light guide plate 810b and light sources 820a and 820b. The difference between this embodiment and the embodiment in FIG. 19 is that: the shapes of the microstructures in the microstructure region 811b of the light guide plate 810b are circular. Please refer to FIG. 25 to FIG. 27, FIG. 25 to FIG. 27 respectively illustrates the top views of the light guide assemblies according to a plurality of embodiment of the present invention. The difference between this embodiment and the embodiment in FIG. 24 is that: the shapes of the microstructures in the microstructure region of the light guide plate can be elliptical, triangular, or trapezoidal, respectively.

Although embodiments of the present disclosure and their advantages have been described in detail, they are not used to limit the present disclosure. It should be understood that various changes, substitutions and alterations can be made herein without departing from the spirit and scope of the present disclosure. Therefore, the protecting scope of the present disclosure should be defined as the following claims.

What is claimed is:

1. A light-emitting module, comprising:
   a light guide plate having a front surface, a back surface opposite the front surface, and a light incident surface located between the front surface and the back surface and adjacent to the front surface and the back surface;
   at least one light source located outside the light guide plate, and facing the light incident surface of the light guide plate; and
   a brightness adjustment element, wherein the brightness adjustment element is a tape, the light source is free from overlapping with the brightness adjustment element in the direction perpendicular to the front surface or the back surface and in the direction perpendicular to the light incident surface, the entire brightness adjustment element is located outside the visual area, the entire brightness adjustment element is located on the front surface or the back surface of the light guide plate and the entire brightness adjustment element is parallel with the front surface and the back surface, and wherein the brightness adjustment element has an adhesive layer and a light absorbing layer, the adhesive layer is located between the light absorbing layer and the light guide plate, and the brightness adjustment element comprises:
   a strip portion having a first edge proximal to the light incident surface; and
   at least one protruding portion located on the first edge of the strip portion, wherein the protruding portion is aligned with the light source, and extends away from the first edge.

2. The light-emitting module of claim 1, wherein the protruding portion and the strip portion are located on the light guide plate, and the protruding portion extends toward the light source.

3. The light-emitting module of claim 1, wherein a distance between the protruding portion and the light source is in a range from 4 mm to 6 mm.

4. The light-emitting module of claim 1, wherein the strip portion has a second edge opposite the first edge, and a distance between the first edge and the second edge is in a range from 1 mm to 3 mm.

5. The light-emitting module of claim 1, wherein a difference between a refractive index of the adhesive layer and a refractive index of the light guide plate is in a range from 0.1 to 0.7.

6. The light-emitting module of claim 1, wherein a width of the protruding portion increases as a distance between the light source and the protruding portion increases.

7. The light-emitting module of claim 1, further comprising:
   a cover covering the brightness adjustment element, the light source, and a shaded area of the light guide plate.

8. The light-emitting module of claim 7, wherein the brightness adjustment element is located in the shaded area of the light guide plate.

9. The light-emitting module of claim 1, further comprising:
   a plurality of light sources electrically connected to at least two driving elements, wherein a first portion of the light sources has a first color temperature, and a second portion of the light sources has a second color temperature, and the first portion and the second portion of the light sources are respectively electrically connected to the two driving elements.

10. The light-emitting module of claim 1, wherein the light guide plate further has a microstructure region located on a surface of the front surface or the back surface of the light guide plate, and the brightness adjustment element is located on the same surface of the light guide plate and covers the microstructure region.

11. The light-emitting module of claim 10, wherein a position of the microstructure region corresponds to a position of the light source.

12. A light-emitting module, comprising:
   a plurality of light sources;
   a light guide plate having a visual area, a plurality of microstructure regions, a light incident surface, a front surface, and a back surface opposite the front surface, wherein the light incident surface is located between the front surface and the back surface, and is adjacent to the front surface and the back surface, the microstructure regions are located on the front surface or the back surface, the microstructure regions are proximal to the light incident surface, all of the microstructure regions are located outside the visual area and is substantially aligned with the light sources, each of the microstructure regions has a plurality of microstructures therein, the number of the microstructure regions is the same as the number of the light sources, and the light sources is located outside the light guide plate and faces the light incident surface of the light guide plate; and a brightness adjustment element covering the microstructure region, wherein an area of an orthogonal projection of the microstructure regions on the light guide plate is smaller than an area of an orthogonal projection of the brightness adjustment element on the light guide plate.

13. The light-emitting module of claim 12, wherein a distance between each of the microstructure regions and the light incident surface of the light guide plate is in a range from 1 mm to 5 mm.

14. The light-emitting module of claim 12, wherein the microstructures in the microstructure regions are bumps or pits.

15. The light-emitting module of claim 12, wherein the brightness adjustment element has a first edge and a second edge opposite the first edge, and a distance between the first edge and the second edge is not less than a width of each of the microstructure regions.

16. The light-emitting module of claim 15, wherein the brightness adjustment element has an adhesive layer and a scattering layer, and the adhesive layer is located between the scattering layer and the light guide plate.

17. The light-emitting module of claim 12, further comprising:
a cover covering the microstructure regions, the light sources, and a shaded area of the light guide plate.

18. The light-emitting module of claim 17, wherein the microstructure regions are located in the shaded area of the light guide plate.

19. The light-emitting module of claim 1, wherein the protruding portion is located on the light guide plate, and the strip portion overlaps the light source.

20. The light-emitting module of claim 1, wherein:
the light guide plate has a length and width, and when viewed in a normal direction which is from above or below in a direction normal to the front surface or the back surface of the light guide plate, the light guide plate has a leftmost side and a rightmost side;
the light incident surface is disposed at the leftmost side of the light guide plate;
the strip portion has a second edge opposite to the first edge, wherein each of the first edge and the second edge extend in a width direction of the light guide plate;
when viewed in the normal direction, the first edge of the strip portion forms a leftmost boundary of the strip portion, the second edge of the strip portion forms a rightmost boundary of the strip portion, and the first edge is disposed closer to the light incident surface than the second edge of the strip portion; and
a distal point of the protruding portion farthest away from the first edge of the strip portion is closer to the light incident surface than the first edge of the strip portion, and simultaneously spaced apart from the light incident surface in a length direction of the light guide plate, wherein the protruding portion extends toward the light incident surface without extending past the light incident surface.

21. The light-emitting module of claim 12, wherein:
the light guide plate has a length and width, and when viewed in a normal direction which is from above or below in a direction normal to the front surface or the back surface of the light guide plate, the light guide plate has a leftmost side and a rightmost side;
the light incident surface is disposed at the leftmost side of the light guide plate;
when viewed in the normal direction, there is a space between any two adjacent ones of the light sources in a width direction of the light guide plate;
when viewed in the normal direction, there is a space between any two adjacent ones of the microstructure regions in the width direction of the light guide plate;
each of the microstructure regions is partially aligned in a length direction of the light guide plate with one of the light sources;
each of the microstructure regions is formed of the plurality of microstructures which are clustered together;
spaces between any two adjacent ones of the microstructure regions and all other areas of the light guide plate are free of microstructures, such that all the microstructures are utilized in the forming of the microstructure regions through the clustering of the microstructures and all other areas of the light guide plate are free of microstructures;
the space between any two adjacent ones of the microstructure regions is less than the space between any two adjacent ones of the light sources, and simultaneously, the space between any two adjacent ones of the microstructure regions is greater than a difference between the space between any two adjacent ones of the light sources and the space between any two adjacent ones of the microstructure regions; and
the brightness adjustment element has a plurality of protruding portions respectively corresponding to the microstructure regions.

22. The light-emitting module of claim 21, wherein when viewed in the normal direction, the rightmost edges of the microstructures regions are substantially aligned in width direction of the light guide plate, and a distance between a rightmost edge of any one of the microstructure regions and the rightmost side of the light guide plate is greater than the distance between the rightmost edge of said any one of the microstructure regions and the leftmost side of the light guide plate.

23. The light-emitting module of claim 22, wherein when viewed in the normal direction, the distance between the rightmost edge of said any one of the microstructure regions and the rightmost side of the light guide plate is many times greater than the distance between the rightmost edge of said any one of the microstructure regions and the leftmost side of the light guide plate.

* * * * *